(12) United States Patent
Han et al.

(10) Patent No.: US 12,614,395 B2
(45) Date of Patent: Apr. 28, 2026

(54) THREE-DIMENSIONAL (3D) OBJECT DETECTION BASED ON MULTIPLE TWO-DIMENSIONAL (2D) VIEWS

(71) Applicant: QUALCOMM Incorporated, San Diego, CA (US)

(72) Inventors: Shizhong Steve Han, San Diego, CA (US); Hong Cai, San Diego, CA (US); Haiyan Wang, Mountain View, CA (US); Yinhao Zhu, La Jolla, CA (US); Yunxiao Shi, San Diego, CA (US); Fatih Murat Porikli, San Diego, CA (US); Sourab Bapu Sridhar, Jarna (SE); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 102 days.

(21) Appl. No.: 18/585,480

(22) Filed: Feb. 23, 2024

(65) Prior Publication Data

US 2025/0166391 A1     May 22, 2025

Related U.S. Application Data

(60) Provisional application No. 63/599,985, filed on Nov. 16, 2023.

(51) Int. Cl.
*G06V 20/58* (2022.01)
*G06V 10/10* (2022.01)
*G06V 10/84* (2022.01)

(52) U.S. Cl.
CPC .............. *G06V 20/58* (2022.01); *G06V 10/10* (2022.01); *G06V 10/84* (2022.01)

(58) Field of Classification Search
None
See application file for complete search history.

(56) References Cited

U.S. PATENT DOCUMENTS

| | | | |
|---|---|---|---|
| 10,176,404 B2 * | 1/2019 | Boulkenafed | .......... G06V 10/82 |
| 12,367,596 B2 * | 7/2025 | Rajan | ...................... G06V 20/70 |
| 2020/0134850 A1 * | 4/2020 | Takeyasu | .............. G06V 10/764 |
| 2020/0388047 A1 * | 12/2020 | Ondruska | ................. G06T 7/55 |
| 2021/0241035 A1 * | 8/2021 | Sutherland | ......... G06V 10/7784 |

(Continued)

OTHER PUBLICATIONS

Deng S., et al., "VISTA: Boosting 3D Object Detection via Dual Cross-VIew SpaTial Attention", arXiv:2203.09704v1 [cs.CV] Mar. 18, 2022, 12 Pages.

(Continued)

*Primary Examiner* — Frank Johnson
(74) *Attorney, Agent, or Firm* — QUALCOMM Incorporated; Espartaco Diaz Hidalgo

(57) ABSTRACT

Certain aspects of the present disclosure provide techniques for performing 3D object detection. Such techniques may include obtaining one or more inputs associated with one or more two-dimensional (2D) views of a scene; selecting a set of 2D views of the scene from a plurality of 2D views of the scene based on the one or more inputs, the set of 2D views comprising a first 2D view of the scene and a second 2D view of the scene; and performing three-dimensional (3D) object detection in the scene based on the set of 2D views.

20 Claims, 23 Drawing Sheets

(56)                    References Cited

U.S. PATENT DOCUMENTS

| | | | | |
|---|---|---|---|---|
| 2023/0079388 A1* | 3/2023 | Fisher | ....................... | G06T 3/60 |
| | | | | 382/103 |
| 2023/0109712 A1* | 4/2023 | Romero | ................ | G06V 10/82 |
| | | | | 382/181 |
| 2023/0351769 A1* | 11/2023 | Wu | ....................... | G06V 10/762 |
| 2024/0046657 A1* | 2/2024 | Li | .......................... | G06V 20/58 |
| 2025/0014354 A1* | 1/2025 | Dworak | ................ | G06V 20/58 |
| 2025/0054286 A1* | 2/2025 | Huang | ................... | G06V 20/58 |

OTHER PUBLICATIONS

Lang A.H., et al., "PointPillars: Fast Encoders for Object Detection from Point Clouds", arXiv:1812.05784v2 [cs.LG] May 7, 2019, pp. 1-9.
Liu Z., et al., "BEVFusion: Multi-Task Multi-Sensor Fusion with Unified Bird's-Eye View Representation", arXiv:2205.13542v2[cs. Cv] Jun. 16, 2022, 12 Pages.
Shi G., et al., "PillarNet: Real-Time and High-Performance Pillar-based 3D Object Detection", arXiv:2205.07403v5 [cs.CV] Aug. 26, 2022, 18 Pages.
Zhou S., et al., "FastPillars: A Deployment-friendly Pillar-based 3D Detector", arXiv:2302.02367v3 [cs.CV] 8 Feb. 2023, 13 Pages.
International Search Report and Written Opinion—PCT/US2024/053276—ISA/EPO—Feb. 19, 2025.
Lu Y., et al., "Range-Aware Attention Network for LiDAR-based 3D Object Detection with Auxiliary Point Density Level Estimation", arxiv.org, Cornell University Library, 201 Olin Library Cornell University Ithaca, NY 14853, Jun. 14, 2022, 12 Pages, XP091246308, abstract, figures 1,2 section "III.D. Anisotropic Gaussian Mask".

* cited by examiner

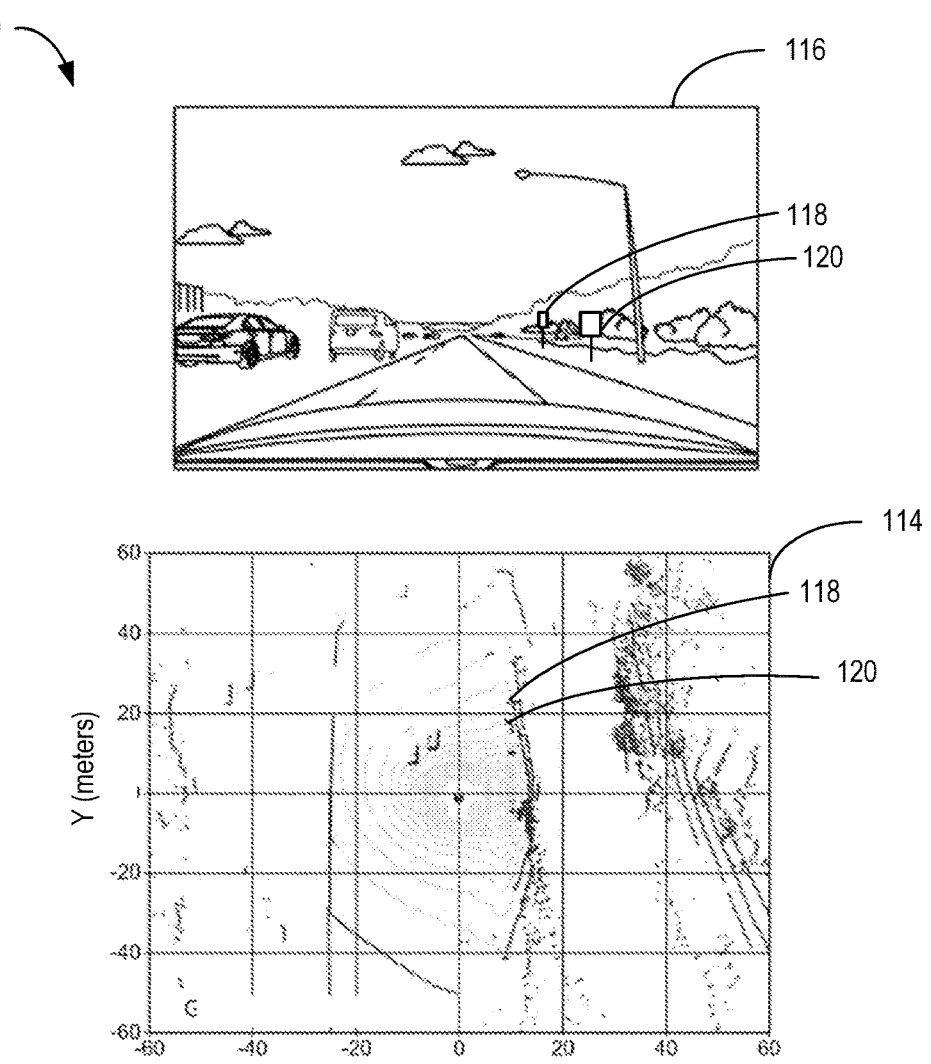
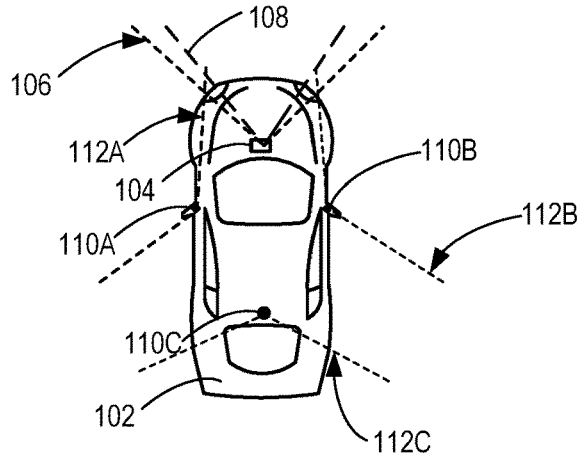
*FIG. 1*

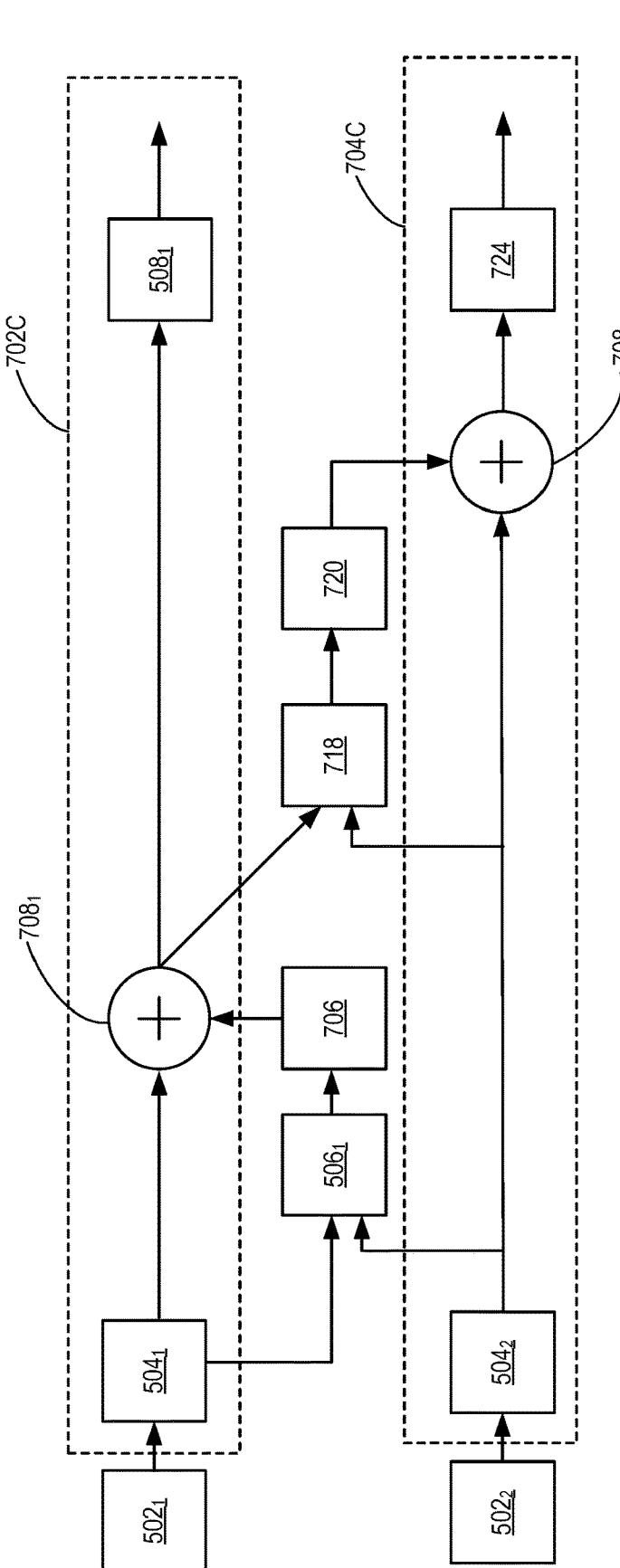
*FIG. 7C*

1400

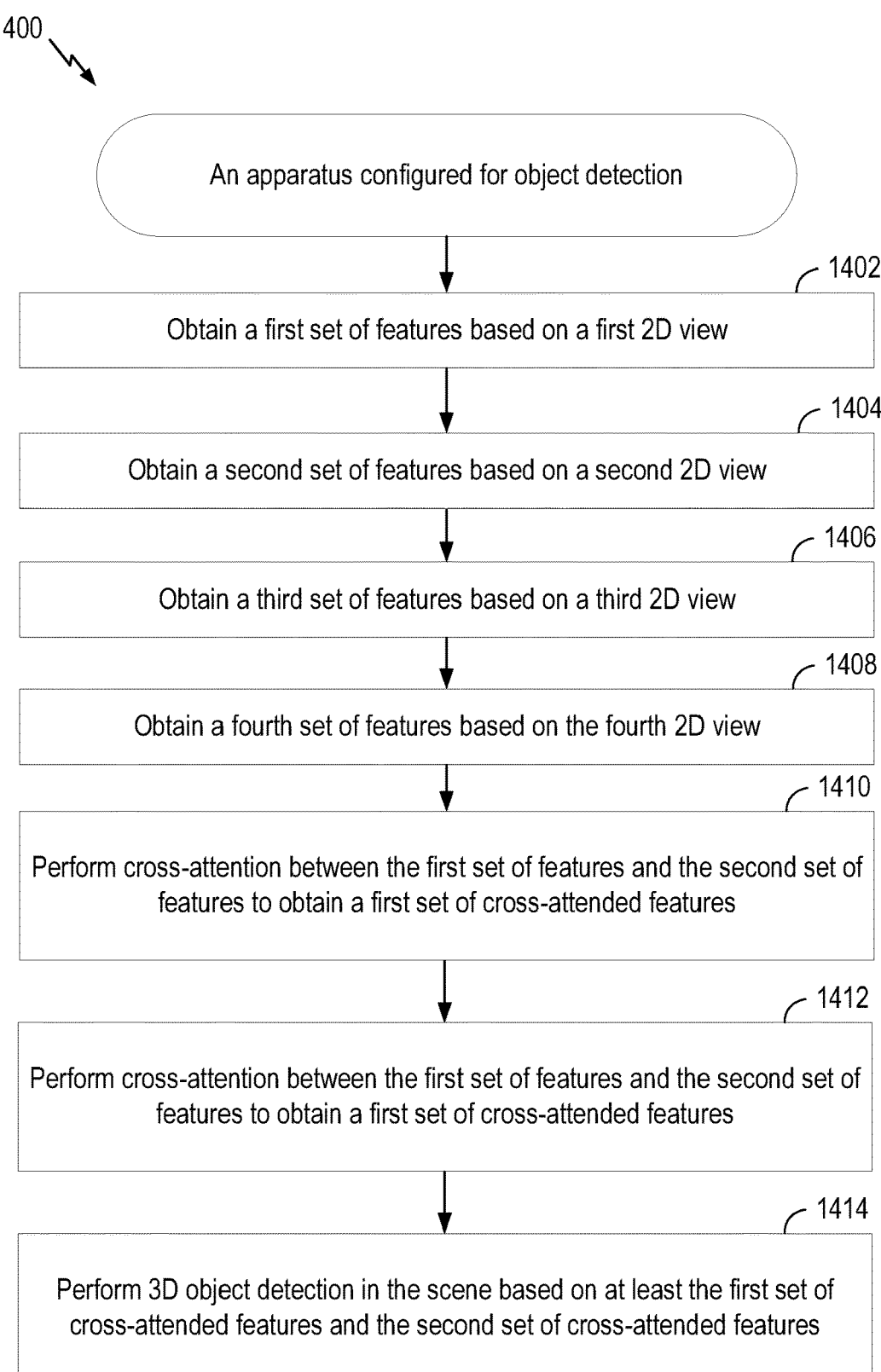

An apparatus configured for object detection

1402
Obtain a first set of features based on a first 2D view

1404
Obtain a second set of features based on a second 2D view

1406
Obtain a third set of features based on a third 2D view

1408
Obtain a fourth set of features based on the fourth 2D view

1410
Perform cross-attention between the first set of features and the second set of features to obtain a first set of cross-attended features 1412
Perform cross-attention between the first set of features and the second set of features to obtain a first set of cross-attended features 1414
Perform 3D object detection in the scene based on at least the first set of cross-attended features and the second set of cross-attended features

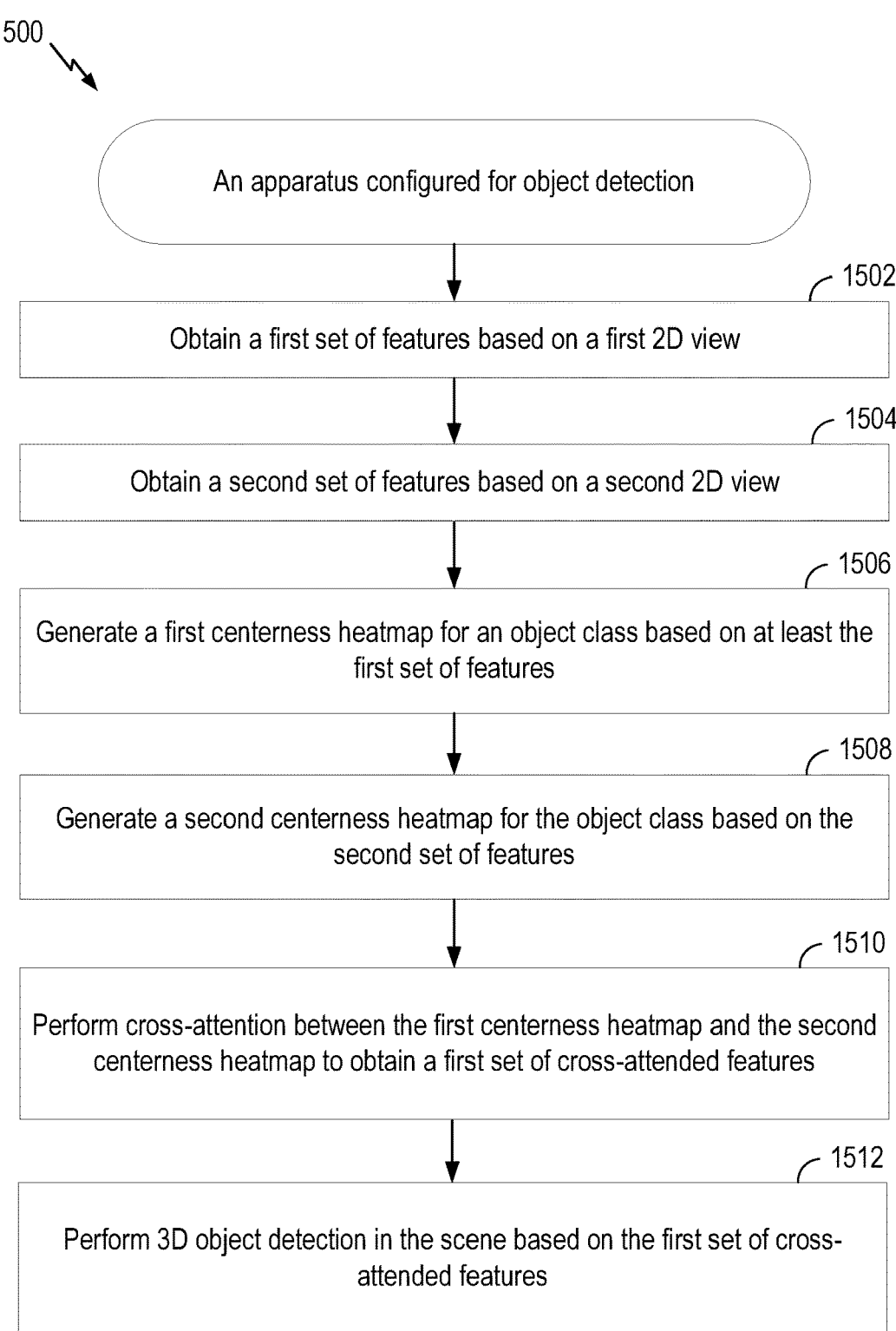

An apparatus configured for object detection

1502

Obtain a first set of features based on a first 2D view

1504

Obtain a second set of features based on a second 2D view

1506

Generate a first centerness heatmap for an object class based on at least the first set of features

1508

Generate a second centerness heatmap for the object class based on the second set of features

1510

Perform cross-attention between the first centerness heatmap and the second centerness heatmap to obtain a first set of cross-attended features

1512

Perform 3D object detection in the scene based on the first set of cross-attended features

1602

Processing System

1606

1620

Processor(s)

1630

Computer-Readable Medium/Memory

1621

Circuitry for obtaining features

1631

Code for obtaining features

1622

Circuitry for performing cross-attention

1632

Code for performing cross-attention

1623

Circuitry for performing 3D object detection

1633

Code for performing 3D object detection

1624

Circuitry for generating centerness heatmaps

1634

Code for generating centerness heatmaps

Detection Head
322

View
Transformer
312

1712

1714
1716
1718
1720

| Recommended 2D View | | |
|---|---|---|
| Zone | | |
| ●●● | | |
| 2D View / Attended Features | | |

Multi-Viewpoint
Gating Controller
1702

2D Object
Detection
1706

2D View
Selection
1708

Geolocation
1710

Detection Head
902

2D Image
1704

1800

An method for object detection

1802

Obtain one or more inputs associated with one or more 2D views of a scene

1804

Select a set of 2D views of the scene from a plurality of 2D views of the scene based on the one or more inputs

1806

Perform three-dimensional (3D) object detection in the scene based on the set of 2D views

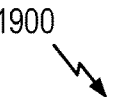
1900
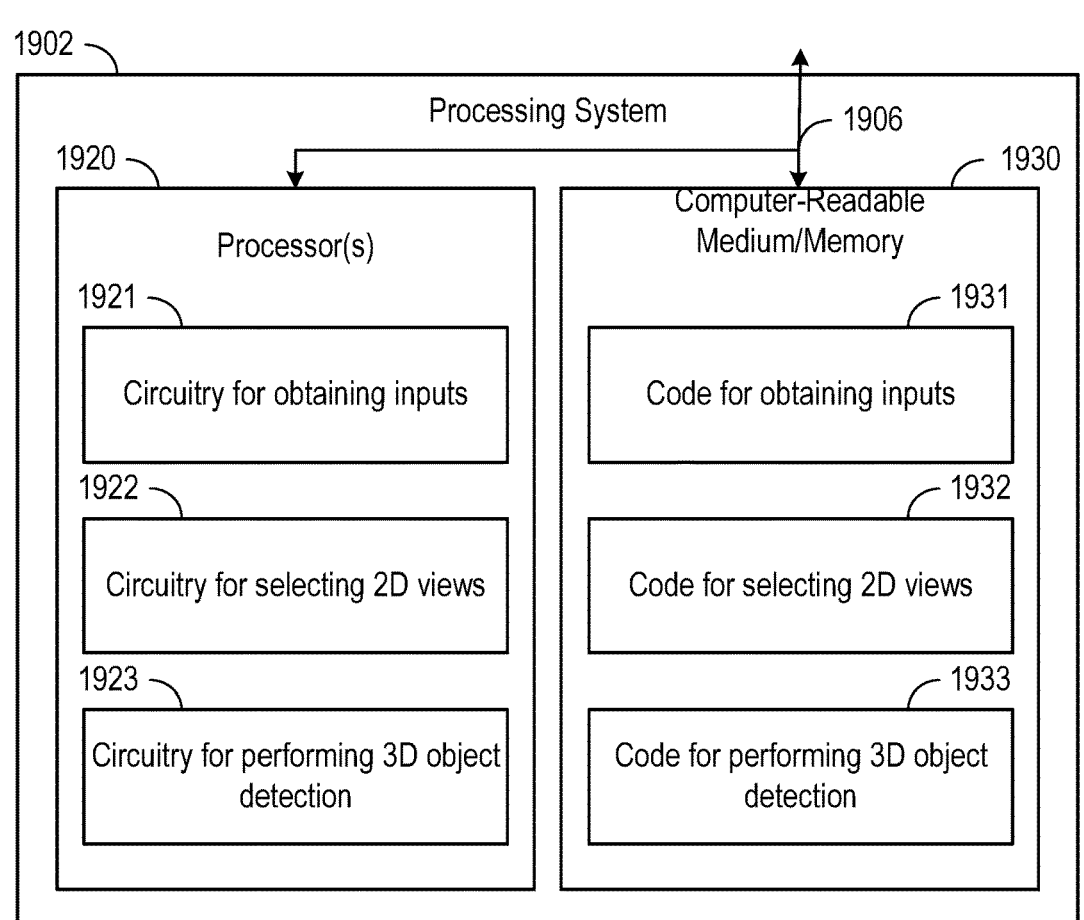
FIG. 19

THREE-DIMENSIONAL (3D) OBJECT DETECTION BASED ON MULTIPLE TWO-DIMENSIONAL (2D) VIEWS

CROSS-REFERENCE TO RELATED APPLICATIONS

This application claims the benefit of and priority to U.S. Provisional Patent Application No. 63/599,985, filed on Nov. 16, 2023, the entire contents of which are hereby incorporated by reference.

INTRODUCTION

Field of the Disclosure

Aspects of the present disclosure relate to three-dimensional (3D) object detection.

DESCRIPTION OF RELATED ART 3D object detection is an important technology with applications in autonomous and non-autonomous vehicles, augmented reality/virtual reality (AR/VR), robotics, surveillance, and other fields. The ability to accurately detect objects in 3D space provides important environmental perception capabilities for systems operating in the physical world. Object detection may include localization of the object, as in determining a location of the object, and/or classification of the object, as in determining a type of the object (e.g., bike, car, plant, etc.).

In autonomous driving systems, for example, robust 3D object detection allows an automated vehicle to be aware of surrounding obstacles like other cars, pedestrians, traffic signs, etc. Accurate localization in 3D space provides distance, depth, and orientation information to facilitate path planning and navigation. Vehicles are typically equipped with a 3D sensor, such as LiDAR (Light Detection and Ranging), to capture sensor data about the environment/scene. 3D object detection algorithms analyze this sensor data to identify and localize objects of interest surrounding the vehicle.

Conventional 3D object detection techniques often take a single-view approach, such as projecting a LiDAR point cloud to a 2D view and performing feature encoding and object detection within that view. For instance, LiDAR point clouds are frequently processed from a birds-eye perspective. While computationally efficient, such single-view methods lack comprehensive spatial context and have difficulty detecting objects with ambiguous or obscured appearances from certain orientations.

SUMMARY

One aspect provides a method for performing object detection. The method includes obtaining a first set of features based on a first two-dimensional (2D) view of a scene corresponding to a first viewpoint; obtaining a second set of features based on a second 2D view of the scene corresponding to a second viewpoint, wherein the first 2D view and the second 2D view are based on input from a first input sensor; obtaining a third set of features based on a third 2D view of the scene corresponding to a third viewpoint; obtaining a fourth set of features based on a fourth 2D view of the scene corresponding to a fourth viewpoint, wherein the third 2D view and the fourth 2D view are based on input from a second input sensor; performing cross-attention between the first set of features and the second set of features to obtain a first set of cross-attended features; performing cross-attention between the third set of features and the fourth set of features to obtain a second set of cross-attended features; and performing 3D object detection in the scene based on at least the first set of cross-attended features and the second set of cross-attended features.

Another aspect provides a method for performing object detection. The method includes obtaining a first set of features based on a first 2D view of a scene corresponding to a first viewpoint; obtaining a second set of features based on a second 2D view of the scene corresponding to a second viewpoint; generating a first centerness heatmap for an object class based on at least the first set of features; generating a second centerness heatmap for the object class based on the second set of features; performing cross-attention between the first centerness heatmap and the second centerness heatmap to obtain a first set of cross-attended features; and performing 3D object detection in the scene based on the first set of cross-attended features.

Another aspect provides a method for performing 3D object detection. The method includes: obtaining one or more inputs associated with one or more two-dimensional (2D) views of a scene; selecting a set of 2D views of the scene from a plurality of 2D views of the scene based on the one or more inputs, the set of 2D views comprising a first 2D view of the scene and a second 2D view of the scene; and performing three-dimensional (3D) object detection in the scene based on the set of 2D views.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks. An apparatus may comprise one or more memories; and one or more processors, coupled to the one or more memories, configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 1 depicts an example directed to obtaining and processing data corresponding to a 3D representation of a surrounding environment to detect objects in the surrounding environment.

FIG. 7A-7C depict details directed to applying cross-attention between encoded features from two distinct views.

FIG. 14 depicts an example method for performing multi-2D-viewpoint 3D object detection using cross-attention between multiple views.

FIG. 15 depicts an example method for performing 3D object detection using cross-attention between centerness heatmaps.

FIG. 16 depicts aspects of an example processing system.

FIG. 19 depicts aspects of an example processing system.

DETAILED DESCRIPTION

Figure 2:
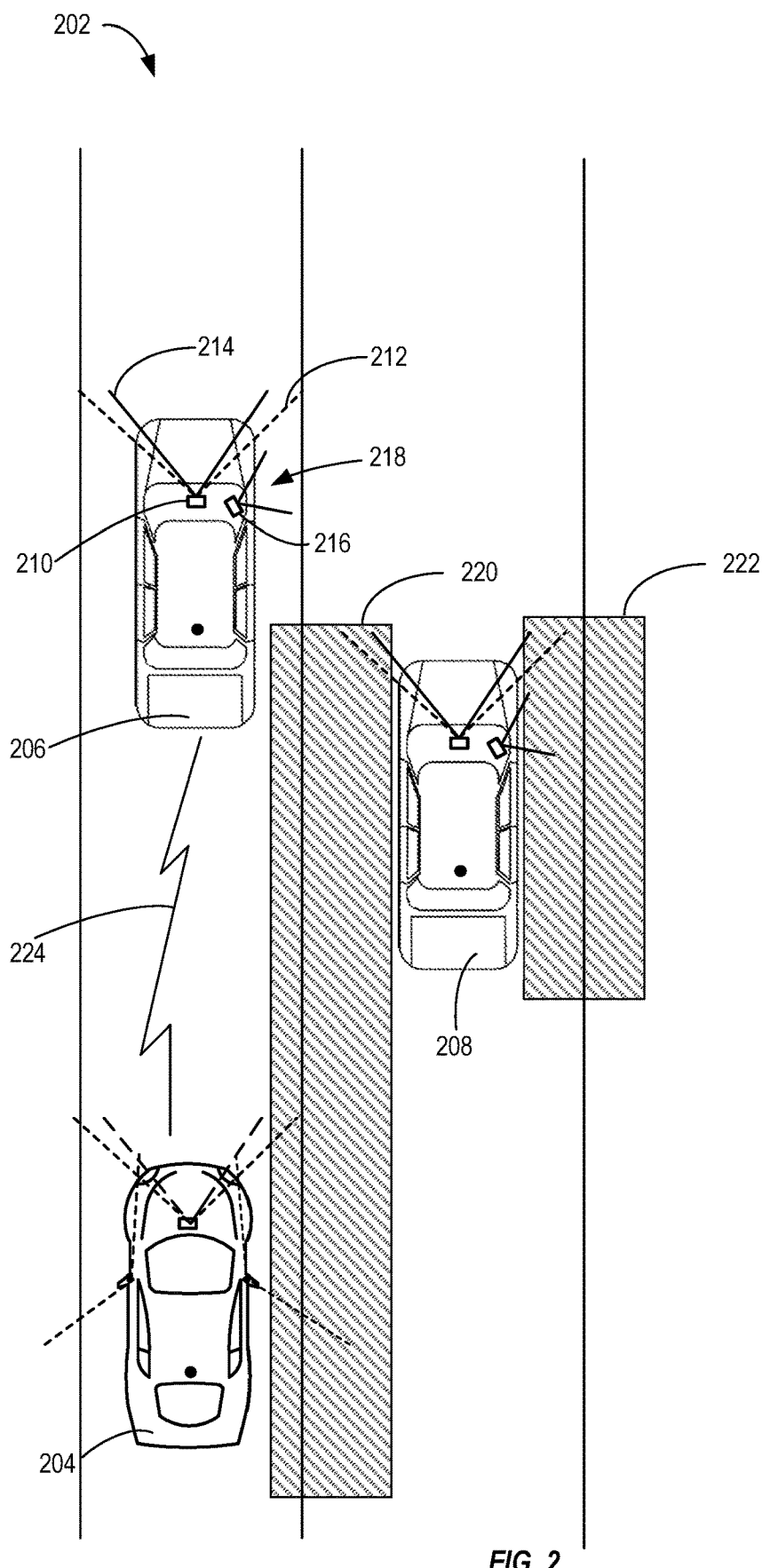
FIG. 2 depicts a first example operating environment for a multi-2D-viewpoint 3D object detection system.

Aspects of the present disclosure provide apparatuses, methods, processing systems, and computer-readable mediums for performing 3D object detection using multiple 2D views corresponding to different viewpoints (e.g., bird's-eye-view, front view, back view, right side view, left side view, etc.) of an environment (also referred to as a "scene"), also referred to herein as multi-2D-viewpoint 3D object detection.

3D object detection has a variety of uses. For example, 3D object detection is a critical capability for autonomous and non-autonomous vehicles and robots to perceive their surroundings and navigate safely. However, technical problems arise with respect to accuracy and robustness of detection. For example, point cloud data captured by LiDAR sensors can be difficult to interpret directly due to its unstructured nature. In addition, projecting to a singular birds-eye view representation restricts context aggregation. Further, some objects like traffic signs become obscured and challenging to detect from a top-down viewpoint.

Accordingly, aspects herein provide techniques for multi-2D-viewpoint 3D object detection using multiple 2D views corresponding to different viewpoints of a scene. Use of multi-2D-viewpoint 3D object detection may provide the technical effect of improved detection of objects that may be obscured in one 2D view, but that are more apparent in another 2D view. In certain aspects, more than two 2D views (i.e., three or more) are used for multi-2D-viewpoint 3D object detection, providing even further improved object detection. For example, the techniques herein may support any number of 2D views, including more than two 2D views.

In some cases, multi-2D-viewpoint 3D object detection may provide one or more improved technical effects. For example, multi-2D-viewpoint 3D object detection may be used with numerous viewpoints, sensors, and data modalities. Detection accuracy may be improved, especially for challenging objects like traffic signs that are obscured in individual views. Depth resolution and handling of occlusions may also be strengthened by the diversity of viewpoints. Multi-2D-viewpoint 3D object detection may also deliver more reliable 3D environmental perception to enhance autonomous navigation and path planning.

In some aspects, multi-2D-viewpoint 3D object detection uses cross-attention between multiple 2D views, also referred to herein as multi-2D-viewpoint cross-attention. For example, multi-2D-viewpoint cross-attention may support more than two 2D views. Cross-attention may interactively propagate relevant features between 2D views, which may exchange complementary information to consolidate useful characteristics from the different viewpoints. Certain aspects are discussed herein using multi-2D-viewpoint cross-attention for performing multi-2D-viewpoint 3D object detection, which may provide certain beneficial technical effects. However, it should be understood that other techniques for multi-2D-viewpoint 3D object detection may be used in some cases in combination with certain other aspects discussed herein.

In certain aspects, a first plurality of 2D views may be based on input from a first sensor (e.g., LiDAR) and a second plurality of 2D views may be based on input from a second sensor (e.g., camera). For example, a first sensor may provide a 3D representation of a scene, such as a point cloud, that is transformed to multiple 2D views, such as using projection or pillarization techniques as discussed herein. In some cases, such 2D views may be referred to as 2D projection views or 2D pillarization views. In another example, a sensor may provide one or more 2D representations of a scene, such as images, that are used to render a 3D representation of a scene that is transformed to multiple 2D views. In some cases, such 2D views may be referred to as 2D perspective views. In some cases, the ability to geometrically transform 3D representations into numerous 2D views provides a flexible technical framework. For example, 2D views can be indirectly generated based on available information from sensors. In certain aspects, the 2D views may be obtained directly from a sensor or another source (e.g., another device or apparatus).

In some aspects, the 3D object detection may be based on performing cross-attention between the first plurality of 2D views to generate a first set of cross-attended features, and performing cross-attention between the second plurality of 2D views to generate a second set of cross-attended features. The 3D object detection may be based on the first set of cross-attended features and the second set of cross-attended features. Use of cross-attended features from multiple sensors may provide the technical effect of improved detection of objects that may be both obscured in certain 2D views, and may be obscured or less apparent to certain sensors. Though the use of two pluralities of 2D views is discussed, it should be noted that more than two pluralities of 2D views can be used to generate a plurality of sets of cross-attended features, which may be used for 3D object detection.

In some aspects, the 3D object detection may be based on generating a first centerness heatmap for an object class based on a first set of features derived from a first 2D view, and generating a second centerness heatmap for an object class based on a second set of features derived from a second 2D view. A centerness heatmap for an object class may help determine how centered a point is within a bounding box identifying the bounds of an object class (e.g., bikes, stop signs, etc.). Though two centerness heatmaps corresponding to two 2D views are discussed, there may be additional centerness heatmaps corresponding to additional 2D views. In some aspects, the 3D object detection may be based on performing cross-attention between the centerness heatmaps, and performing 3D object detection based on the cross-attended features. The use of centerness heatmaps may help generate bounding boxes and classifications for objects, and the use of different 2D views may improve objected detection for objects not easily detected from a single 2D view.

In some aspects, the 3D object detection may be based on a set of gated 2D views. In particular, multi-2D-viewpoint 3D object detection, as discussed, may use multiple 2D views for 3D object detection. Techniques are discussed herein for how to select which 2D views may be used for 3D object detection. For example, a multi-viewpoint gating controller can select 2D views based on one or more inputs to use for 3D object detection. 2D views selected for 3D object detection may be referred to as "enabled," while 2D views not selected for 3D object detection may be referred to as "disabled." For example, the multi-viewpoint gating controller may select one or more 2D views of a plurality of 2D views to utilize for 3D object detection. In certain aspects, multi-viewpoint gating controller controls whether one or more view transformations, (e.g., projections or pillarizations), are performed or are not performed based on the selected one or more 2D views. Example inputs can include 2D images, user-selected views, view selection by another apparatus, geolocation data, preliminary object detections, and/or the like. In certain aspects, 2D views that are determined to not likely contribute additional information to the 3D object detection process can be disabled such that the 3D object detection process does not expend resources processing such unneeded 2D views, such as generating such 2D views, encoding such 2D views, performing cross-attentions using such 2D view, and/or the like. Accordingly, such gating of 2D views may provide the beneficial technical effect of reducing processing requirement and/or latency for 3D object detection.

It should be noted that certain aspects are discussed herein with respect to obtaining a point cloud as a 3D representation of a scene. However, it should be noted that other types of 3D representations may be used with the techniques discussed herein. Further, certain aspects are discussed herein with respect to using LiDAR or a camera as a sensor for capturing data used to generate a 3D representation of a scene. However, it should be noted that other types of sensors may be used with the techniques discussed herein.

Example Environment for Performing Multi-2D-Viewpoint 3D Object Detection

FIG. 1 illustrates an example directed to obtaining and processing data corresponding to a 3D representation of a surrounding environment to detect objects in the surrounding environment. In an example, the data obtained may be point cloud data, represented as a point cloud frame 114, and/or 2D view 116 (e.g., a camera image, a projection to 2D of a 3D representation, etc.), though other data may be obtained. As depicted in FIG. 1, a vehicle 102 includes a sensor 104 having a field of view 106. As the vehicle 102 moves along a trajectory, the sensor 104 generates data, such as point cloud data of a scene or 2D view 116 that is within its field of view 106. The sensor 104 may be mounted to the vehicle 102. In certain aspects, sensor 104 is a light detection and ranging (LiDAR) sensor that emits laser signals and captures reflected light to generate point cloud data within its field of view 106. As the vehicle 102 moves along a trajectory, the sensor 104 may obtain point cloud data including point in time frames corresponding to its field of view 106 at multiple points and at multiple times along the trajectory. In certain aspects, the sensor 104 can obtain point cloud data in real-time. In some aspects, sensor 104 is an image sensor for acquiring one or more images of a scene (e.g., 2D view 116), such as a camera, or another type of sensor. In certain aspects, additional sensor(s) may be included on the vehicle 102, such as sensors 110A, 110B, and 110C and may have associated fields of view 112A, 112B, and 112C. These sensors 110A-C may include LiDAR sensors, depth cameras, and/or other sensors, such as other range sensors, that may supplement data captured by the sensor 104. In certain aspects, the vehicle 102 is a ground-based vehicle such as a car, truck, or shuttle. However, in other aspects, the vehicle 102 may be an air-based drone or aircraft, a water-based boat or submarine, or a space-based robot or rover.

An example point cloud frame 114 generated from aggregated point cloud data from sensor 104 and/or one or more of sensors 110A-C provides a 3D representation of surfaces and objects in the external environment surrounding the vehicle 102 at an instant in time. As depicted in FIG. 1, the example point cloud frame 114 includes multiple objects detected within the field of view of the sensor 104; in some examples, the point cloud frame 114 includes the first object 118 and the second object 120 detected within multiple, or overlapping, field of views from one or more sensors 104, 110A, 110B, and 110C mounted on the vehicle 102. After processing the point cloud frame 114 through a multi-2D-viewpoint 3D object detection model as described herein, a bounding box and/or prediction can be generated for a detected object. The bounding box and/or prediction may represent the detection, including localization, of an object in 3D space.

The point cloud frame 114 comprises a plurality of points defined by x, y, and z coordinates in 3D space. Each point corresponds to a reflection of sensor signals from objects/surfaces in the environment. In certain aspects, the points may not be uniformly spaced and may have varying densities in different parts of the point cloud frame 114 based on properties of the sensed environment. Such points correspond to surfaces that reflected signals back towards the sensors (e.g., 104). Transparent, absorbent or distant surfaces may be missing or sparsely captured in the point cloud frame 114. The rendering of the point cloud frame 114 depicted in FIG. 1 includes the points but does not show additional surfaces that may be present but not sensed.

As further depicted in FIG. 1, an example 2D view 116 from a particular viewpoint is illustrated. The 2D view 116 may be captured directly, or rendered from a 3D representation, such as point cloud frame 114. This 2D view can represent one of many possible 2D views corresponding to different viewpoints that may be captured directly or rendered from a 3D representation. For example, different 2D views may be generated by projecting the point cloud frame 114 to a view plane from different 3D viewpoint positions and orientations. For example, one or more side view viewpoints can be generated from data associated with the 3D point cloud frame 114.

An object in the surrounding environment of the vehicle 102 may be represented in the example point cloud frame 114 and/or 2D view 116. Examples of objects may include a vehicle, pedestrian, traffic sign, or other obstacle/structure along the path of the vehicle 102 or along a path of another vehicle. For example, objects 118 and 120 are shown. Points corresponding to the objects 118 and 120 reflect signals from their surfaces that face towards the sensor(s) (e.g., 104) of the vehicle 102.

FIG. 2 depicts a first example operating environment for a multi-2D-viewpoint 3D object detection system in accordance with examples of the present disclosure. In certain aspects, the operating environment 202 corresponds to an autonomous driving scenario. In certain aspects, the operating environment 202 corresponds to a non-autonomous driving scenario. In certain aspects, a first vehicle 204 is equipped with one or more sensors, such as for capturing point cloud and/or image data of a surrounding environment as discussed. In certain aspects, the first vehicle 204 represents an autonomous vehicle that utilizes the captured sensor data for automated driving and navigation. FIG. 2 further depicts a second vehicle 206 present in the external environment of the first vehicle 204 that gets captured by the first vehicle's 204 sensor(s). The second vehicle 206 represents an example object that is detected by the multi-2D-viewpoint 3D object detection system. A third vehicle 208 also present in the surrounding environment of the first vehicle 204 is captured in the sensor data and may be detected by the system.

In certain aspects, a first sensor 210 is attached to or otherwise mounted on the first vehicle 204. In certain aspects, the first sensor 210 is a LiDAR device that scans the surrounding environment and generates point cloud data within its field of view 212. In certain aspects, the first sensor 210 may be an image sensor having a field of view 214. In certain aspects, images acquired by the image sensor may be utilized to generate a 3D representation of the scene, such as point cloud data, to perform object detection in accordance with examples described herein. In certain aspects, a second sensor 216 is also mounted or otherwise attached to the first vehicle 204, such as a camera, radar, ultrasonic sensor, LiDAR, etc. and can provide sensor data with its own distinct field of view 218.

In certain aspects, a first covered area 220 refers to a portion of the environment covered by the field of view 214 of the first sensor 210 as it scans. For example, as vehicle 206 moves in position and time, the covered area 220 can refer to an area that was previously scanned or otherwise for which point cloud data having some measured recency exists. Points within this covered area 220 can be captured in the point cloud data from the first sensor 210 and/or the second sensor 216. In some examples, points in the covered area 220 can also be captured by a sensor of vehicle 208. By aggregating data from multiple sensors, the multi-2D-viewpoint 3D object detection system can obtain a more complete representation of obstacles and objects surrounding the vehicle 204 and/or obstacles and objects that may be relevant to the vehicle 204. This enables robust detection of objects like the second vehicle 206, third vehicle 208, and/or other objects which may fall within the overlapped sensing coverage regions.

Similarly, second covered area 222 corresponds to the portion of the surrounding environment that falls within the field of view of a sensor of vehicle 208. Points in this second covered area 222 may be captured by one or more sensors and can further be included in a point cloud. In some examples, point cloud(s) can be shared among one or more vehicles 204, 206, and/or 208. Alternatively, or in addition, one or more projections, encodings, or other representations of a scene, such as 2D view, or representations derived from or otherwise based on point cloud data can be shared amongst one or more vehicles. For example, as vehicle 206 acquires data such as point cloud data, image data, or other data indicative of an environment in which vehicle 206 is within, a vehicle 204 and/or 208 can request or otherwise acquire the data from the vehicle 206. Alternatively, or in addition, one or more processing systems residing on, accessible by, or otherwise utilized by vehicle 206 can share a 3D coordinate transformation of the point cloud data, a 3D encoding of the point cloud data, a recommendation for a view viewpoint selection, and/or other information relevant to an environment common to the vehicle 206, 204, and/or 208. For example, vehicle 206 can transmit such information via one or more wireless mediums 224 to vehicle 204. Accordingly, vehicle 204 can acquire such information, and in some instances, process different information and/or process a reduced amount of information than would otherwise be required to be processed without the information from the vehicle 206.

Figure 3A:
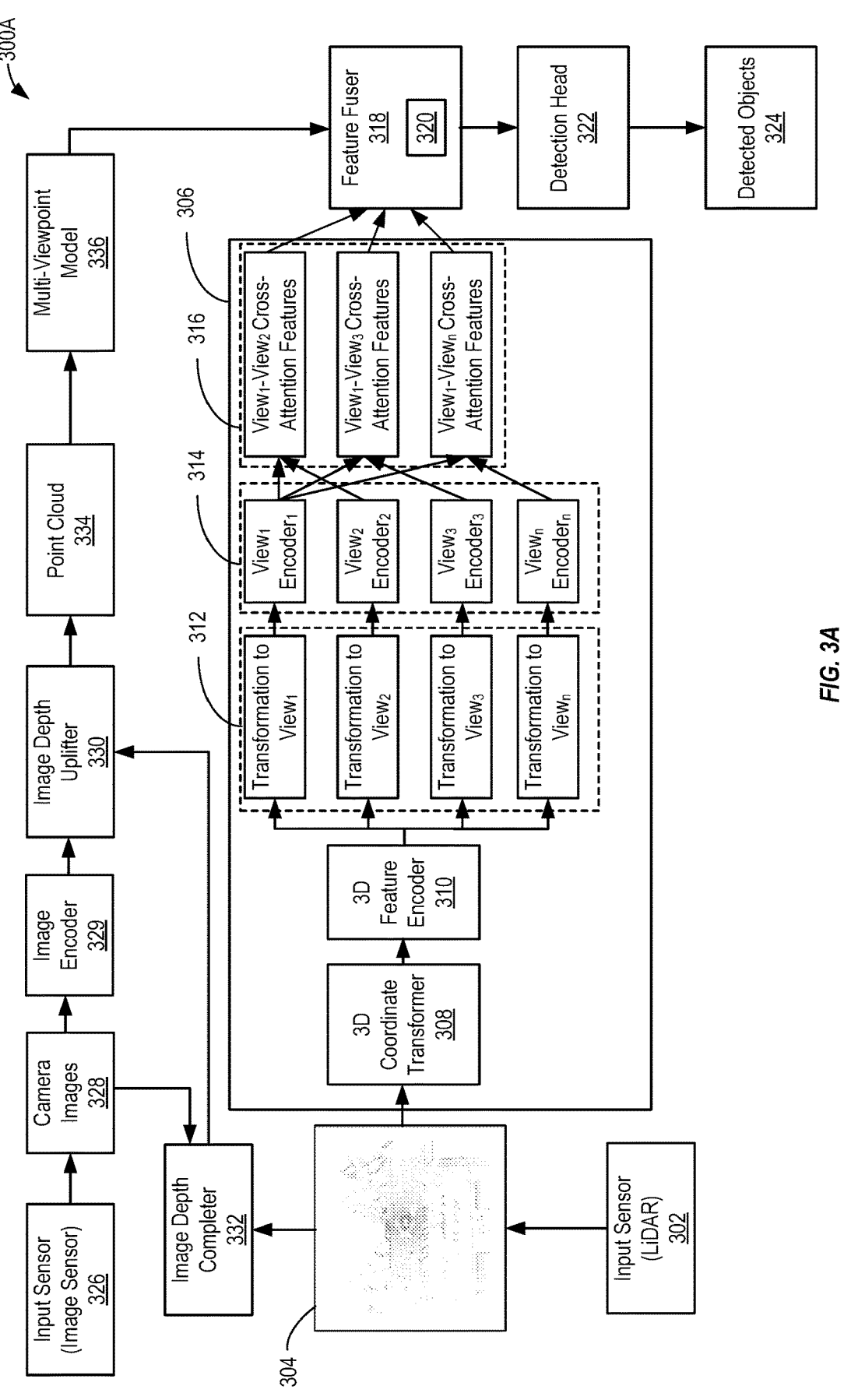
FIGS. 3A-B depict systems for performing multi-2D-viewpoint 3D object detection.

FIG. 3A illustrates a system 300A for performing multi-2D-viewpoint 3D object detection using cross-attention for 3D object detection in accordance with examples of the present disclosure. In certain aspects, one or more components of system 300A may be implemented or run on one or more processors, which may be coupled to one or more memories. For example, one or more processors may be configured to perform one or more functions of one or more components of system 300A, such as by executing instructions stored in one or more memories, or without requiring instructions from memory. In certain aspects, the one or more processors may be part of a single apparatus, such as a vehicle, a computing device, a user equipment, etc. In certain aspects, an apparatus may include one or more of the components of system 300A, and/or may be coupled to one or more components of system 300A.

The system 300A includes an input sensor 302 configured to capture a 3D representation of an environment at least partially surrounding or otherwise within a field of view of the input sensor 302. In this example, the 3D representation is captured as point cloud data 304 though other types of data may be used in a similar manner as discussed with respect to point cloud data 304. In one example, the input sensor 302 may comprise a LiDAR sensor mounted to a vehicle. However, other variants of the input sensor 302 including stereo cameras, infrared depth sensors, radar, sonar, or combinations thereof may be utilized as well.

In certain aspects, the point cloud data 304 is provided to a multi-viewpoint model 306. As previously discussed, the point cloud data 304 is captured by the input sensor 302 and represents a 3D scan of the surrounding environment at a particular point in time from the sensor's 302 perspective. In certain aspects, the point cloud data 304 comprises a plurality of points distributed in three-dimensional space, with each point defined by x, y, and z coordinates. The points correspond to reflected signals from objects and surfaces within an external environment surrounding the sensor 302. The density and sparsity of points in the point cloud data 304 may vary based on properties of the environment. Regions containing objects or surfaces that strongly reflect signals back to the sensor 302 contain a high density of points.

Regions that are distant, absorptive, or angled away from the sensor 302 may contain fewer points or gaps.

In certain aspects, the sensor 302 continuously generates updated point cloud data 304, enabling dynamic analysis and object motion modeling. Individual point cloud frames, such as frame 114 of FIG. 1, may provide snapshots of the sensed 3D environment at specific instants in time from the sensor's 302 perspective. While the point cloud data 304 provides a perspective 3D spatial distribution of points, the point cloud data 304 does not directly connect or group the points into distinct objects. In certain aspects, multi-view-point model 306 is configured to detect, and in some cases localize objects, such as through segmentation and detection algorithms.

In certain aspects, multi-viewpoint model 306 processes the input point cloud data 304 to detect objects present in the 3D environment on the basis of a scene. While processing multiple point cloud frames can track movement of both the sensor 302 and objects over time, in certain aspects, the multi-viewpoint model 306 operates on individual frames or aggregated sets of point cloud data 304, such as depending on the application requirements. In certain aspects, the multi-viewpoint model 306 comprises a machine learning (ML) architecture, such as a neural network architecture including multiple stages. In certain aspects, the multi-viewpoint model 306 includes a 3D coordinate transformer 308 that converts the unordered point cloud data 304 into a structured 3D voxel grid format for ordered processing, a 3D feature encoder 310 that extracts a descriptive feature vector corresponding to each voxel location in the 3D voxel grid, one or more view transformers 312 that project the 3D voxel features into distinct 2D views surrounding the point cloud data 304 from different viewpoints, one or more view encoders 314 that encode viewpoint-specific features for each generated 2D view, one or more cross-attention modules 316 that interactively propagate information between the view-specific feature representations to emphasize complementary aspects, at least one feature fusion module 318 that aggregates the cross-attended view features from the one or more cross-attention modules 316 into a unified representation, and a detection head 322 that applies this fused multi-viewpoint representation to detect, and in some cases localize, objects in 3D space based on the original point cloud data 304.

In certain aspects, the point cloud data 304 comprises an unordered set of points irregularly spaced in 3D space. While this captures spatial details, it is an unstructured format. In certain aspects, the 3D coordinate transformer 308 transforms the point cloud data 304 into a structured 3D voxel grid that partitions the 3D space into a regular grid of equally sized voxels (volumetric pixels). Such voxelization may facilitate subsequent ordered processing, convolution, and/or feature extraction by the downstream model components. The 3D coordinate transformer 308 may implement voxelization methods such as but not limited to: dividing the 3D space into a fixed grid and aggregating points within each voxel cell, adaptive voxelization based on the point density to balance detail and efficiency, and/or using a parameterized function like kernel-based interpolation to convert points into a continuous density field before discretization.

In certain aspects, the 3D coordinate transformer 308 is a neural network layer. In certain aspects, the 3D coordinate transformer 308 may be performed as a separate preprocessing stage. The 3D coordinate transformer 308 may also append additional voxel attributes like density, surface normal, and/or texture properties based on the point cloud data

304. In certain aspects, the 3D coordinate transformer 308 can transform the point cloud data 304 to a common coordinate system, such as Cartesian, cylindrical, or spherical coordinate system. The resulting 3D voxel grid provides an ordered representation, such as for 3D feature extraction and cross-view projections.

In certain aspects, the 3D feature encoder 310 extracts descriptive features from the 3D voxel grid output by the 3D coordinate transformer 308. The voxel grid may structure the point cloud data 304 into a standardized 3D format. The 3D encoder 310 may then process this representation to generate a feature vector corresponding to each voxel location. In certain aspects, the 3D encoder 310 comprises a 3D convolutional neural network (CNN) that takes the voxel grid as input and outputs a multi-dimensional feature representation for each voxel. The encoder CNN architecture may contain multiple 3D convolution, activation, and pooling layers to hierarchically extract point cloud features based on the input voxel grid. Different kernel sizes may capture localized and global context.

In certain aspects, the 3D encoder 310 may apply 3D transformers or graph neural networks to extract features based on voxel relationships. In certain aspects, in addition to point attributes, these architectures can encode greater spatial context. The resulting per-voxel feature vectors may encode descriptive information about the local 3D geometry and relationships captured in the point cloud data 304 and represented in the voxel grid. The features may become input to subsequent stages of the multi-viewpoint model 306, such as for cross-view processing.

In certain aspects, view transformers 312 project the 3D voxel features from the 3D encoder 310 into distinct 2D views surrounding the point cloud data 304. In certain aspects, the view transformers 312 process the voxel features from different viewpoints to obtain multi-view representations, such as a bird's eye view viewpoint, a front view viewpoint, a side view viewpoint, and/or the like. In certain aspects, each view transformer 312 may apply viewpoint projection techniques. For example, the view transformers 312 may apply orthographic projection approaches such as: parallel projection of the 3D features onto a 2D plane oriented in the viewing direction; perspective projection based on a defined viewpoint and projection plane; and/or isometric projections capturing specific 2D angles of the 3D voxel features. In certain aspects, the projection parameters like focal length, principal point, and viewing orientation are configured differently for each view transformer 312 to generate distinct viewpoint renderings of the 3D voxel grid. The resulting 2D representations, corresponding to 2D views, encode how the point cloud geometry would appear from the perspective of different viewpoints surrounding the point cloud data 304. In certain aspects, this reveals complementary information to improve object detection compared to a single view. In certain aspects, the view transformers 312 are implemented as differentiable projection layers within a neural network architecture to enable end-to-end training.

In certain aspects, for each 2D view representation, individual view encoders 314 encode viewpoint-specific features. In certain aspects, the 2D view representations provide different vantage points of the 3D point cloud data 304. In certain aspects, the view encoders 314 analyze each 2D view independently to extract salient features. In certain aspects, the view encoders 314 apply convolutional neural networks (CNNs) to the 2D view inputs. The CNNs may contain multiple convolution, nonlinearity, and pooling layers to hierarchically extract features for each view. In certain aspects, for a given view, the encoder CNN architecture filters and combines the 2D view into successively abstract feature maps. The resulting encoded feature vector captures informative characteristics about the rendered point cloud from that specific viewpoint. In certain aspects, separate encoders 314 with the same or different architectures can be instantiated for each distinct view rendered by the view transformers 312. In certain aspects, the multiple encoded view representations become input to subsequent cross-view interaction and/or fusion stages.

In certain aspects, each of one or more cross-attention modules 316 generate cross-attention features, also referred to as cross-attended features, between corresponding encoder layers of (e.g., two) different views. For example, the one or more cross-attention modules 316 can interactively analyze and exchange information between the encoded features from multiple 2D views output by the view encoders 314. In certain aspects, the cross-attention modules 316 consolidate useful complementary information from the distinct 2D view representations, providing a more comprehensive feature description compared to individual views.

In certain aspects, the cross-attention modules 316 apply multi-head dot-product attention. In certain aspects, for a given cross-attention module 316, the encoded features from a first view are treated as a query vector and the encoded features from a second view become the key vector and value vector. The query and key vectors are compared to obtain relevance scores, or an attention matrix, which is applied to the value vector to propagate relevant features.

In certain aspects, cross-attention can be applied bidirectionally between view pairs, as discussed further herein. For example, bird's eye view (BEV) features can attend to front view features (BEV as query, and front view as key and value), and vice versa (e.g., front view features can attend to BEV features (front view as query, and BEV as key and value)), in an alternating fashion to enable rich multi-view context aggregation, which may improve object detection.

In certain aspects, in addition to or alternative to attention, cross-view gating, correlation, graph propagation, and/or other interaction mechanisms can be implemented via modules 316 to exchange information between the view-specific encodings from the encoders 314. In certain aspects, the resulting cross-attended feature outputs preserve consolidated characteristics from multiple 2D views. This may strengthen the model's feature representation for subsequent fusion and detection.

In certain aspects, a feature fuser 318 can aggregate the cross-attended, encoded features from multiple 2D views to create a unified multi-viewpoint feature representation 320. In certain aspects, the unified multi-viewpoint feature representation 320 may be specific to cross-attended features obtained between multiple 2D views and a common 2D view, for example between front view/side view and BEV. In certain aspects, the feature fuser 318 consolidates the complementary information exchanged between the multiple views via the cross-attention modules 316. In certain aspects, different fusion techniques can be applied to consolidate such information, including one or more of: concatenative fusion to combine the feature vectors from all views into a single concatenated vector, additive fusion to sum together the feature vectors from each view, convolutional fusion where the vectors are merged through a series of convolutional neural network layers, and/or attention-based fusion to selectively propagate relevant features from each view. In certain aspects, the feature fuser 318 unifies the cross-view interactions, providing a consolidated feature representation for the final object detection head 322. Compared to using any single view's features, the fused multi-viewpoint representation may contain richer information about the relationships and context of the point cloud data 304 from multiple viewpoints. In certain aspects, the specific fusion approach is differentiable, enabling end-to-end training through backpropagation. For example, the model can learn optimal techniques to consolidate the cross-view feature interchange. In certain aspects, the fused features can be provided to the detection head 322 which may generate 3D object detections 324, which may include bounding boxes, centerness indications, and/or object classifications.

In certain aspects, the detection head 322 processes the unified multi-viewpoint feature representations 320. In certain aspects, the detection head 322 analyzes the consolidated representations combining complementary information from multiple views and identifies portions likely corresponding to distinct objects and estimates their 3D bounding shapes and classes. In certain aspects, the detection head 322 comprises a convolutional neural network that applies progressive filtering and integration of the fused features. The CNN architecture may contain additional convolution, nonlinearity, and upsampling layers to ultimately predict: class probability heatmaps indicating likelihood of different object classes at each spatial location, bounding box regression heatmaps estimating 3D size/orientation of objects, and/or centerness heatmaps identifying object centers. In certain aspects, the predicted heatmaps are processed through clustering, filtering, and/or thresholding steps to generate the final detected objects 324, such as with estimated 3D bounding boxes and/or object class labels.

In certain aspects, performing multi-viewpoint feature fusion before detection provides greater context to differentiate objects, estimate depth, and/or infer occluded or sparse regions compared to single view detection. In certain aspects, the multi-viewpoint feature representations 320 and detection head 322 leverage the complementary information from multiple view encoders 314 and their cross-attention interconnections to provide robust detection performance, for example, accurately identifying objects like vehicles, pedestrians, barriers, traffic signs, etc. In certain aspects, the detected objects 324 represent the complete 3D object detection results generated by the system and can then be utilized for downstream tasks like motion planning, navigation, and/or control of autonomous vehicles or robots.

In certain aspects, the system 300A includes one or more second input sensors 326 comprising one or more image sensors that capture 2D image data of the surrounding environment from the one or more sensor's 326 perspective(s). In certain aspects, an image sensor 326 includes an integrated camera that acquires 2D images or video frames of the external scene. The scene captured by the image sensor 326 may be the same as, overlap, and/or be different from the scene captured by the input sensor 302. The image sensor 326 may capture RGB, grayscale, or other image types.

In certain aspects, the image sensor(s) 326 provides a complementary 2D view(s) to the 3D point cloud input 304 from sensor 302. Fusing information from both modalities can improve detection accuracy compared to 3D or 2D data alone. For example, image views can provide additional appearance, texture, semantic, and contextual details that may be sparse or missing in the 3D point cloud representation of the same environment. In certain aspects, the multi-viewpoint model 306 projects image features from the image sensor(s) 326 into 2D views that geometrically align with the projections of the 3D point cloud features. In certain aspects, this enables consolidation of the aligned image view features with 3D voxel view features via the cross-attention 316 and feature fusion 318 stages.

In certain aspects, an image depth uplifter 330 upsamples the 2D image data from sensor(s) 326 to generate an enhanced image representation with higher resolution depth information. While the image sensor(s) 326 may provide high-resolution appearance information (e.g., camera images 328), the depth or 3D structure of the scene is ambiguous from monocular 2D images. Thus, in certain aspects, the camera images 328 are encoded at the image encoder 329 and provided to the image depth uplifter 330, which may increase the depth sampling rate of the encoded 2D image to improve localization, for example through bilinear upsampling of the depth channel. In certain aspects, the image depth uplifter 330 includes a machine learning model such as a convolutional neural network trained to increase image depth resolution and dimensionality through learned upsampling transformations.

In certain aspects, the image depth completer 332 generates or predicts missing or unknown depth values for the depth-uplifted image representation obtained from the image depth uplifter 330. In certain aspects, the image depth completer 332 leverages image content and context to infer depth for portions of an image where measured range data is sparse or unavailable. In certain aspects, this generates a completed depth map aligned with the 2D image. In certain aspects, the image depth completer 332 implements a convolutional neural network trained to estimate depth based on image features. In certain aspects, the image depth completer 332 may obtain depth information from the point cloud data 304 to infer depth for portions of the image where measured range data is sparse or unavailable. In certain aspects, from the completed 2D image, an example point cloud 334 can be constructed based on the estimated depth map information obtained from the image depth completer 332 and the image depth uplifter 330. In certain aspects, this additional synthetic point cloud 334 supplements the native point cloud data 304 from the LiDAR sensor 302, improving coverage and resolution of the 3D representation. Though certain aspects are discussed with respect to generating synthetic point cloud 334, it should be understood that a different type of 3D representation may be generated and used instead of synthetic point cloud 334.

In certain aspects, the point cloud data 334 can be provided to a multi-viewpoint model 336, and in certain aspects, incorporated alongside the native point cloud data 304 for robust fused feature detection. In certain aspects, the multi-viewpoint model 336 is the same as or similar to the multi-viewpoint model 306; thus, the multi-viewpoint model 336 can generate cross-attended features from encoded view specific features obtained from the point cloud 334 and provide the cross-attended features to the feature fuser 318 to be incorporated alongside the cross-attended features of multi-viewpoint model 306. In certain aspects, the generated image point cloud 334 improves localization and depth estimation and fusing additional complementary inputs enhances detection accuracy. In certain aspects, a system may not include input sensor 302, and accordingly multi-viewpoint model 306, and may instead only rely on data from input sensor 326.

Figure 3B:
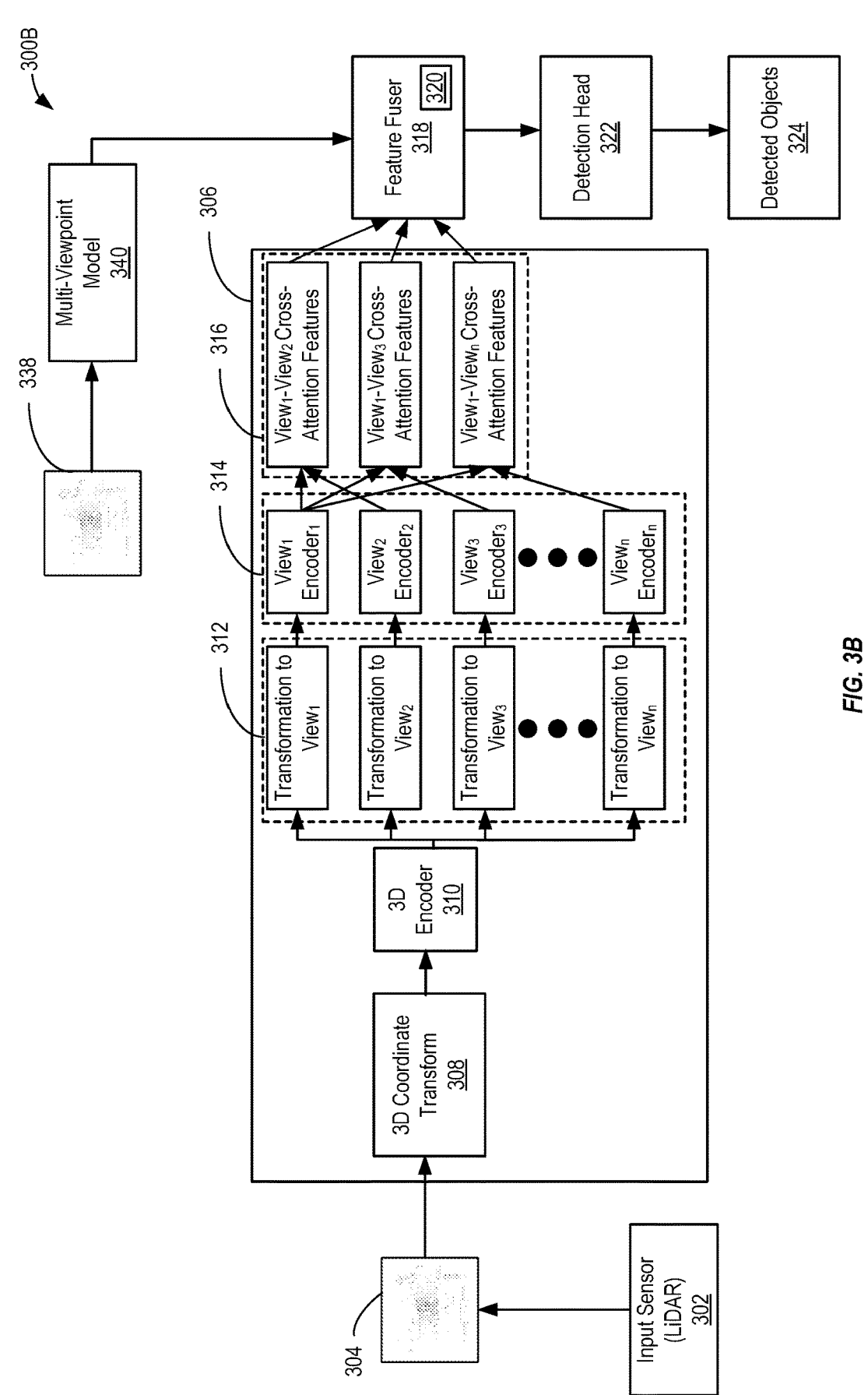

In certain aspects, a second point cloud 338 acquired by additional LiDAR or 3D range sensors can supplement the first point cloud data 304 from sensor 302. In certain aspects, acquiring point cloud data from multiple viewpoints provides greater 3D coverage and resolution of the scene. This may improve localization accuracy and handling of occlusions. Thus, in certain aspects, multiple native 3D point clouds can be fused together within a multi-view processing framework as depicted in system 300B of FIG. 3B.

That is, in certain aspects, the point cloud 338 can be provided to a multi-viewpoint model 340 and incorporated alongside the native point cloud data 304 for robust fused feature detection. In certain aspects, the multi-viewpoint model 340 is the same as or similar to the multi-viewpoint model 306; thus, the multi-viewpoint model 340 can generate cross-attended features from encoded view specific features obtained from the point cloud 338 and provide the cross-attended features to the feature fuser 318 to be incorporated alongside the cross-attended features of multi-viewpoint model 306. In certain aspects, the additional point cloud 338 can be voxelized and encoded independently from point cloud data 304 but can interact through the cross-attention and feature fuser stages. Aggregating data from multiple 3D sensors may provide more complete 3D environmental perception from complementary viewpoints. This may enhance depth, shape, and localization understanding to improve detection performance. Even if multiple sensors have overlapping fields of view, fusing their unique noise and artifact characteristics may provide useful redundancy for robustness.

In certain aspects, sensor data may be captured on a different device than the device that includes the multi-viewpoint model that processes the sensor data. For example, the point cloud 338 can be obtained from an input sensor that is associated with or otherwise mounted onto a vehicle or object that is different from a vehicle or object on which the input sensor 302 is mounted. For example, the input sensor providing point cloud data 338 can be associated with a vehicle 206 (FIG. 2), while the input sensor 302 can be associated with a vehicle 204 (FIG. 2). In examples, the point cloud data 338 can be obtained directly from the vehicle or object (e.g., via wireless communication) or may obtained from a cloud environment.

Certain wireless communication systems may be used to communicate data that is associated with high reliability and low latency. One non-limiting example of such data includes cellular vehicle-to-everything (C-V2X) and vehicle-to-everything (V2X) communications. For example, self-driving cars may rely on wireless communications. Self-driving cars may include some sensors, e.g., Light Detection and Ranging (LIDAR), RAdio Detection And Ranging (RADAR), cameras etc., that are line of sight sensors. C-V2X and V2X communication, however, may include line of sight and non-line of sight wireless communications. Currently C-V2X and V2X communications are examples of using of non-line of sight wireless communications for handling the communication between vehicles approaching a common intersection but not within sight of one another. C-V2X and V2X communication can be used to share sensor information between the vehicles. This and other communication scenarios raise certain considerations. For example, for a particular location or geographical area there may be several vehicles sensing the same information such as an obstacle or a pedestrian. This raises the question of which vehicle should broadcast such information (e.g., sensor data), how such information is shared (e.g., which channel configuration provides reduced latency and improved reliability), and the like.

A C-V2X communication system may have logical channels and transport channels. The logical channels and transport channels may be used as part of uplink and downlink data transfers between a first device (e.g., a headset or vehicle) and a base station or another intermedia node in the network. A person having ordinary skill in the art may recognize that the logical channels may include different types of control channels, e.g., xBCCH, xCCH, xDCCH. The xBCCH type channel may be used when the first device is downloading broadcast system control information from another entity (e.g., a server, or a base station). The xCCCH control channel may be used to transmit control information between the first device (e.g., a vehicle, mobile device, or headset) and the network (e.g., a node in the network base station). The xCCCH control channel may be used when the first device (e.g., a vehicle, mobile device, or headset) does not have a radio resource control connection with the network. The xDCCH control channel includes control information between the first device and a network, and is used by the first device having a radio resource control connection with the network. The xDCCH is also bi-directional, i.e., control information may be transmitted and received by the first device and the network.

Generally, some information bits conveyed in the different types of control channels mentioned above may provide an indication of the location of the data channels (or resources). Since data may span several sub-carriers (depending upon the amount of transmitted data) and the control channels are currently fixed in size, this may introduce transients or gaps in time/frequency between the control channel and the corresponding data channel. This results in unused frequency/time resources of the control channels. It may be possible to leverage the unused frequency/time resources for other purposes for communicating media between vehicles or between devices. It may also be possible to create new channels in a V2X or C-V2X system, specifically, for the exchange of media between vehicles or between devices.

As noted above, vehicles are using many advancements from other fields to improve their safety, infotainment systems, and overall user experience.

For example, object detection algorithms that incorporate sensors such as RADAR, LIDAR, or computer vision may be used in a vehicle to perform object detection while driving. These objects may include lanes in the road, stop signs, other vehicles or pedestrians. Some of the V2X and C-V2X use cases envision cooperative V2X systems to alert the vehicle or driver of the vehicle when there may be a likely collision between the vehicle and another object (e.g., a car, bicycle or person). Because of the relatively nascent nature of the V2X and C-V2X systems, a number of refinements have yet to be envisioned.

Figure 4A:
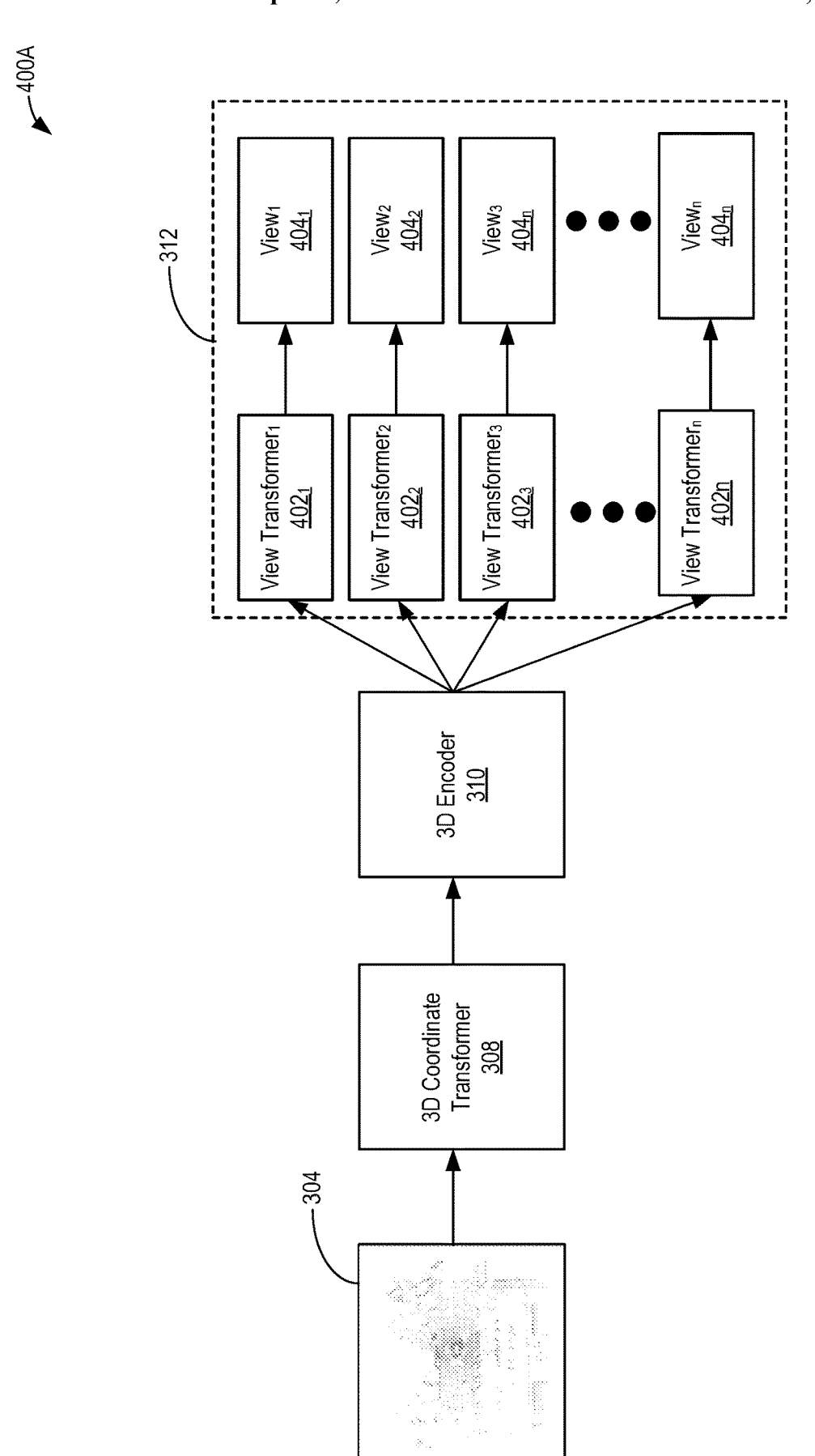
FIG. 4A depicts additional details of a view transformation subsystem that generates multiple 2D views corresponding to different viewpoints.

FIG. 4A illustrates additional details of an example view transformation subsystem 400A that generates multiple 2D view representations, according to examples of the present disclosure. For example, FIG. 4A illustrates examples of certain components of FIGS. 3A and 3B. As previously described with respect to FIG. 3A, in certain aspects, the 3D coordinate transformer 308 converts point cloud data 304 into a structured 3D voxel grid format for ordered processing and the 3D feature encoder 310 extracts a descriptive feature vector corresponding to each voxel location in the 3D voxel grid. Further, in certain aspects, one or more view transformers 312 project the 3D voxel features into distinct 2D views surrounding the point cloud data 304 from different viewpoints. In certain aspects, the one or more view transformers 312 may include view transformers $402_1$-$402_n$. In certain aspects, each view transformer $402_1$-$402_n$ renders a distinct 2D view of the 3D voxel input from a distinct viewpoint. For example, view transformer $402_1$ may correspond to a top-down orthographic projection to generate a BEV $404_1$ of the 3D voxel grid. View transformer $402_2$ may apply a front-facing viewpoint projection to create a front view $404_2$ of the 3D voxel grid. View transformer $402_3$ may apply a side-facing orthographic projection to create a side view $404_3$. View transformer $402_n$ may apply an arbitrary nth viewpoint projection to generate 2D view $404_1$.

In certain aspects, the projection parameters, such as angles, focal lengths, and/or the like, are configured differently per view transformer $402_1$-$402_n$ to realize the desired 2D views $404_1$-$404_n$. In certain aspects, combining multiple viewpoints provides comprehensive environmental perception for detection. In certain aspects, the view transformers $402_1$-$402_n$ share a common model architecture and weights such that a single projection model is trained and applied repeatedly with different configurations to generate the varied viewpoints $404_1$-$404_n$.

In certain aspects, the view transformers $402_1$-$402_n$ may be implemented as neural network layers within a convolutional neural network architecture. As an example, a view transformer $402_1$-$402_n$ that generates a 2D view $404_1$-$404_n$ from voxel 3D input could include a 3D convolution, and a flatten layer to collapse the 3D representation to a one dimensional vector. In certain aspects, the view transformer $402_1$-$402_n$ may include a dense layer to transform the features to the target 2D view $404_1$-$404_n$ dimensions. In certain aspects, sampling or interpolation layers may be included to handle the resolution change from 3D voxels to 2D pixel view. In certain aspects, the parameters of the view transformer $402_1$-$402_n$ network are learned during training in a fully differentiable end-to-end fashion using backpropagation, which allows optimizing the projection model. In certain aspects, different view transformers $402_1$-$402_n$ can have the same architecture but different learned parameters to generate the variety of 2D views $404_1$-$404_n$. In certain aspects, the dimensions and complexity can be adapted as needed for the application.

As an example, for a LiDAR point cloud-based 3D object detection system for autonomous vehicles, the generated 2D views $404_1$-$404_n$ may be generated for specific implementations and coverage. For example, the bird's eye view projection $404_1$ may be directed to cover a 60 m×60 m area around a vehicle and may be an 800×800 pixel image to provide high definition top-down surveillance of the scene. The front view $404_2$ may be a 512×256 pixel image to capture a wide view of the region ahead of the vehicle at lower vertical resolution. The side view $404_3$ may be a 512×128 pixel image to cover critical regions alongside the vehicle. Additional 2D views $404_n$ could include rear view, narrow forward views, synthesized views, etc. depending on application requirements. In certain aspects, the appropriate resolution and coverage of each view $404_1$-$404_n$ depends on the sensor capabilities, environment, and objects being detected. In certain aspects, higher resolution enables detecting small, distant objects but requires more processing.

Figure 4B:
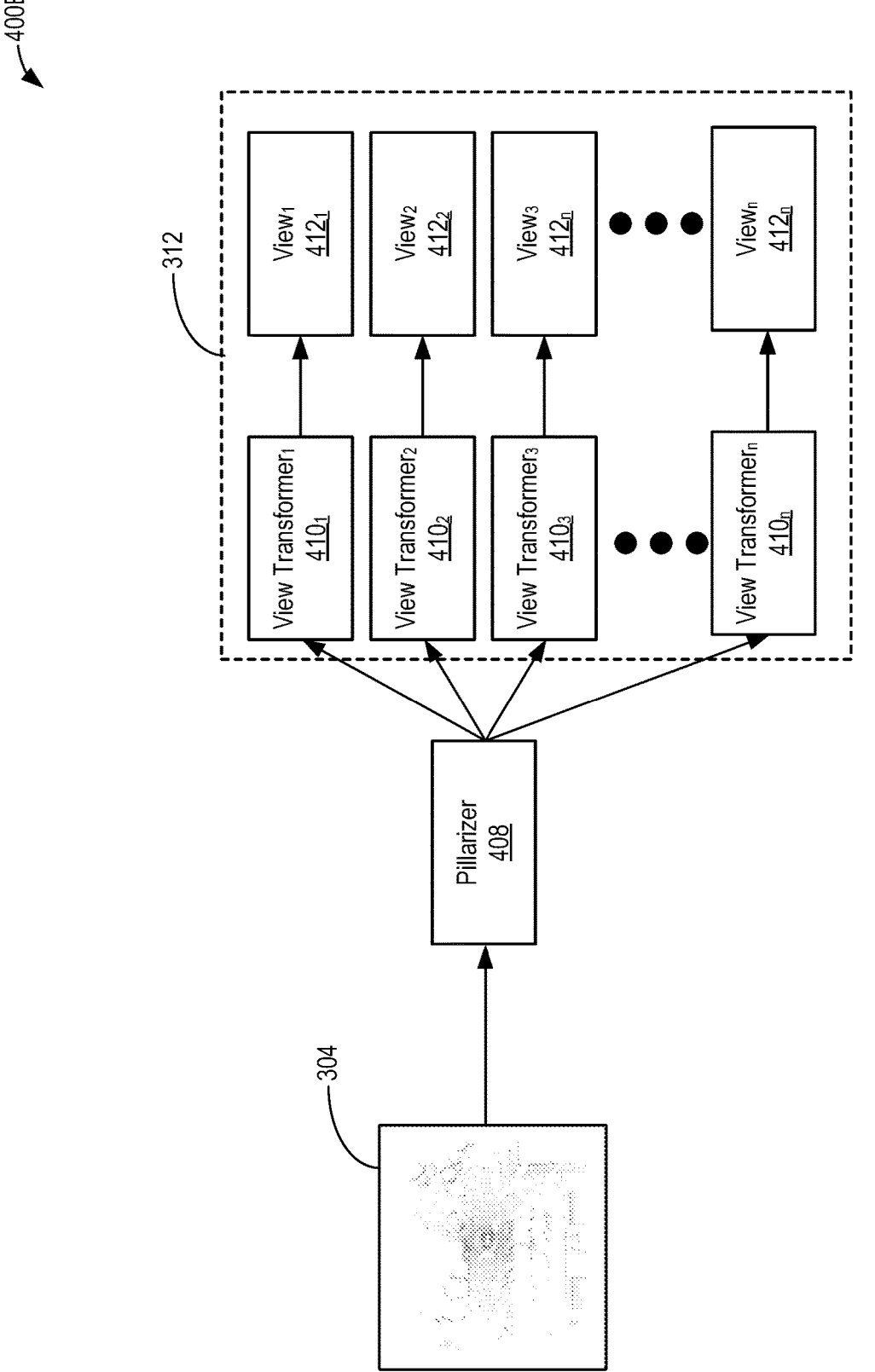
FIG. 4B depicts additional details of a pillarization transformation subsystem that generates multiple 2D views corresponding to different viewpoints.

FIG. 4B illustrates a view transformation subsystem 400B that generates multiple 2D view representations with pillarization, according to examples of the present disclosure. For example, FIG. 4B illustrates examples of certain components of FIGS. 3A and 3B. In particular, when using transformation subsystem 400B, 3D coordinate transformer 308 and 3D feature encoder 310 may not be needed, and instead pillarizer 408 is used. Initially, point cloud data 304 undergoes a pillarization process with a pillarizer 408, where the 3D space is divided into vertical pillars, and each pillar is encoded with features representing the points contained within it.

After pillarization, one or more view transformers 312 project the pillar-encoded features into distinct 2D views surrounding the point cloud data 304 from different viewpoints. In certain aspects, the one or more view transformers $312$ may include view transformers $410_1$-$410_n$. In certain aspects, each view transformer $410_1$-$410_n$ renders a distinct 2D view from the pillarized input. For instance, view transformer $410_1$ might produce a top-down orthographic projection, resulting in a BEV $412_1$, while view transformer $410_2$ might produce a front view $412_2$, and so on.

Projection parameters such as angles and focal lengths may differ among the view transformers $410_1$-$410_n$, producing the desired 2D views $412_1$-$412_n$. In certain aspects, while view transformers $410_1$-$410_n$ can share a common model architecture and weights, they can be uniquely configured to produce their respective 2D views.

In certain aspects, the view transformers $410_1$-$410_n$ can be conceptualized as layers within a convolutional neural network architecture. These could contain a 3D convolution, a flatten layer, and a dense layer, along with possible sampling or interpolation layers. In certain aspects, training parameters for each view transformer $410_1$-$410_n$ could be learned using backpropagation in an end-to-end manner. This may allow for optimizing the projection model to cater to each unique 2D views $412_1$-$412_n$.

In certain aspects, using the pillarized point cloud for object detection, generated 2D views $412_1$-$412_n$ can be fine-tuned for specific purposes. For example, the bird's eye view $412_1$ may encompass a 60 m×60 m area around the vehicle, producing an 800×800 pixel image. Similarly, front view $412_2$ might be a 512×256 pixel image, and the side view $412_3$, 512×128 pixels. In certain aspects, depending on the application's requirements, additional 2D views $412_n$ can be generated. In certain aspects, the exact resolution and coverage for each view $412_1$-$412_n$ are contingent upon sensor capabilities, the environment, and the objects detected.

In certain aspects, the pillarization process serves as an intermediate step, facilitating a more efficient representation of point cloud data $304$ before projecting it into 2D views. This may allow for faster processing and potentially reduces the computational load when generating the 2D views.

Figure 5:
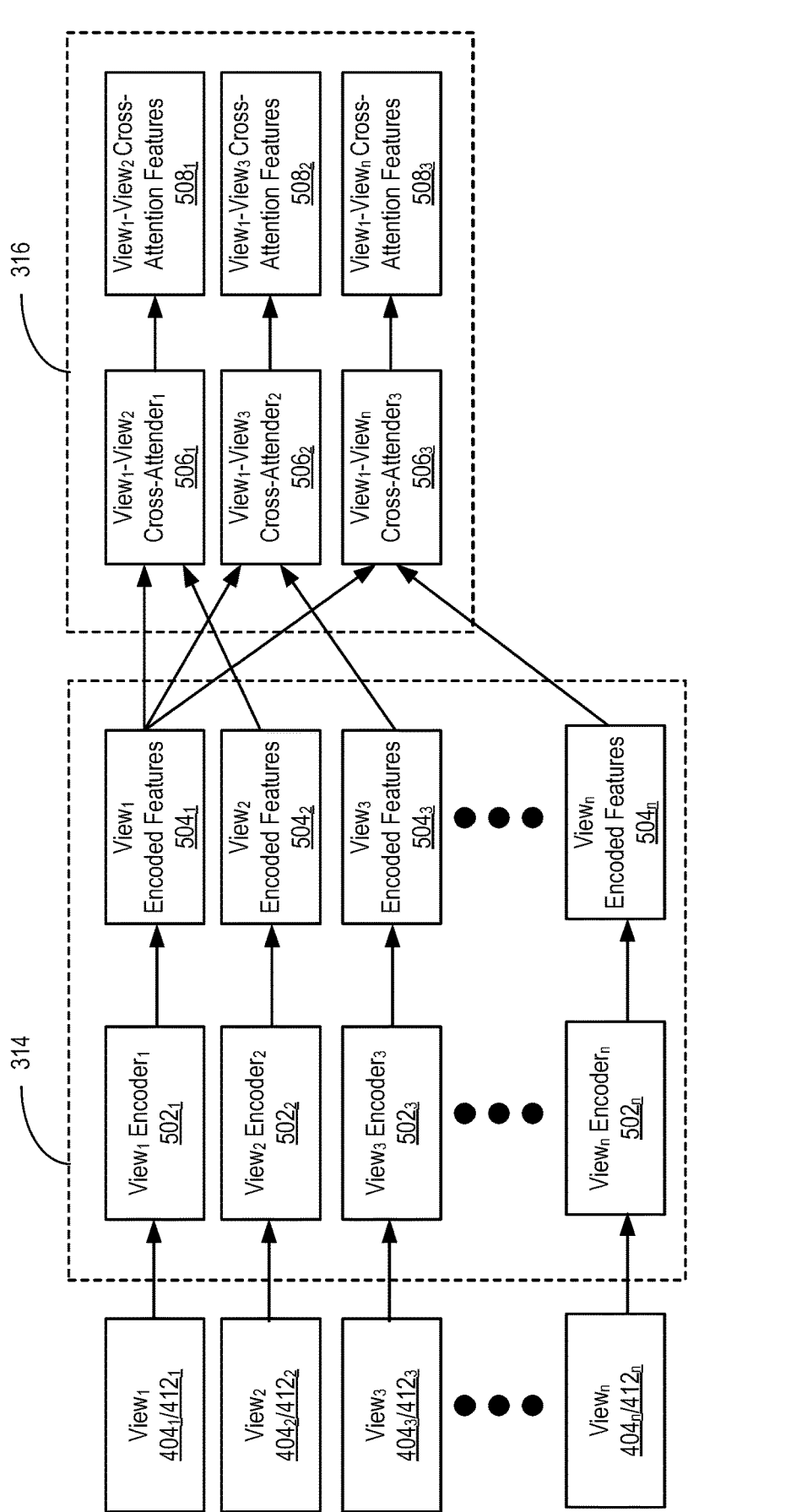
FIG. 5 depicts additional details for generating cross-attention features.

As depicted in FIG. 5, a set of view encoders $502_1$-$502_n$ (e.g., corresponding to an example of view encoders $314$) individually encode the features of each 2D view $404_1$-$404_n$ generated by the view transformers $402_1$-$402_n$ and/or 2D views $412_1$-$412_n$ generated by the view transformers $410_1$-$410_n$. For example, FIG. 5 illustrates examples of certain components of FIGS. 3A and 3B. In certain aspects, a view encoder $502_1$-$502_n$ may be implemented as a convolutional neural network having a variety of convolutional layers to extract and filter and the features. In certain aspects, the architecture and parameters of each view encoder $502$, including number of layers, kernel sizes, number of filters, etc. can be adapted as needed for the complexity of the application requirements.

In certain aspects, each view encoder $502$ may output resulting specific view encoded features $504$. In certain aspects, the resulting specific view encoded features $504$ are generally a flattened one dimensional vector embedding that includes the content and characteristics of the corresponding 2D view $404/412$ in a compact descriptive form. In certain aspects, the dimensions depend on parameters like input view resolution as well as the complexity of the view encoder $502$ model. However, in certain aspects, the view encoder $502$ encodes each distinct projected view of the 3D point cloud into an informative feature vector for subsequent cross-view fusion.

In certain aspects, the specific view encoded features $504$ can be provided to one or more cross-attenders $506$ (also referred to as cross-attention modules, such as corresponding to an example of cross-attention modules $316$) to enable interactions between specific view encoded features $504$ from pairs of distinct 2D views $404/412$. For example, a cross-attender $506_1$ attends encoded features $504_1$ (e.g., from a BEV) to encoded features $504_2$ (e.g., from a front view). As another example, a cross-attender $506_2$ attends encoded features $504_1$ (e.g., from a BEV) to encoded features $504_3$ (e.g., from a side view). In certain aspects, each cross-attender $506$ can implement cross attention by using encoded features from one view as keys and encoded features from another view as queries and values, exchanging information between the two specific view encoded features $504$. In certain aspects, the functionality of the cross-attenders $506$ is to aggregate and propagate relevant features between encoded representations of distinct 2D views to generate cross-attention features $508$, where the cross-attention features $508$ are output by each cross-attender $506$ after propagating information between pairs of specific view encoded features $504$. In certain aspects, the cross-attention features $508$ consolidate relevant information from both specific view encoded features $504$ in a learned, data-driven manner based on computing compatibility between query and key vectors. In certain aspects, the cross-attention features $508$ will have an equal or lower dimension than the specific view encoded features $504$, due in part to computing attention-weighted aggregations.

Figure 6:
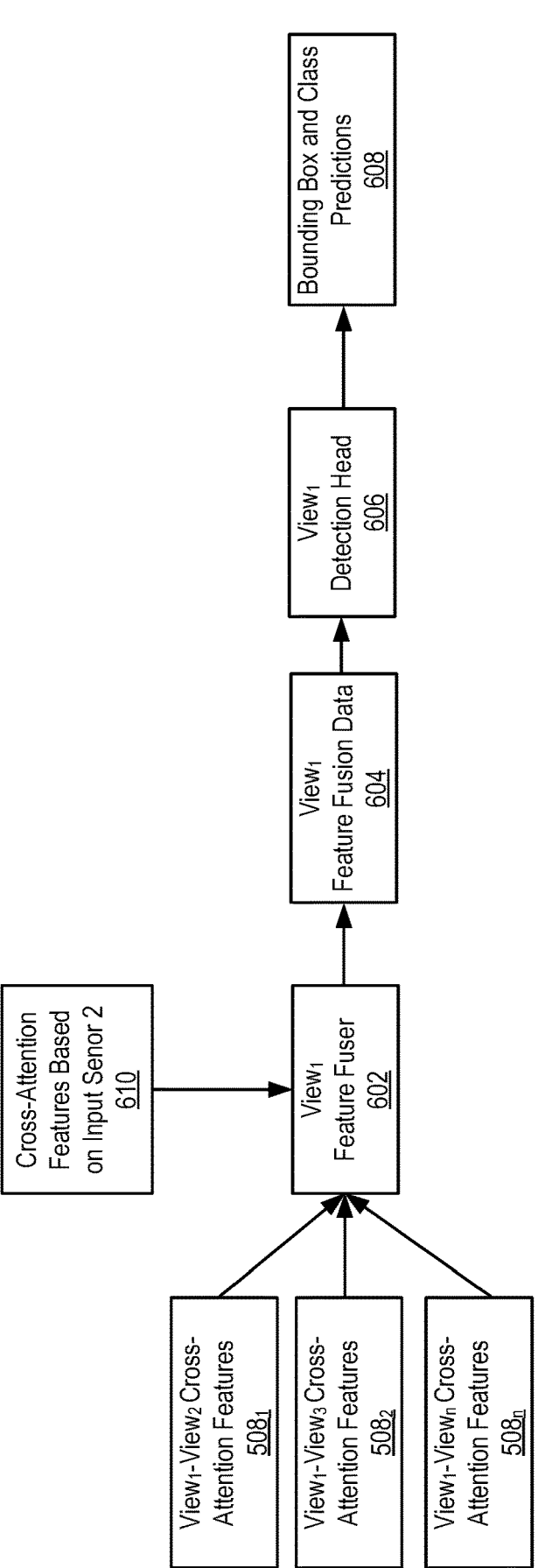
FIG. 6 depicts additional details for generating bounding box and class predictions.

As depicted in FIG. 6, in certain aspects, the view specific feature fuser $602$ (e.g., corresponding to an example of feature fuser $318$) aggregates the cross-attention features $508$ from multiple views to create a fused multi-viewpoint feature representation (e.g. view feature fusion data $604$). In certain aspects, the fused multi-viewpoint feature representation (e.g. view feature fusion data $604$) can then be provided to the view detection head $606$ (e.g., corresponding to an example of detection head $322$), which analyzes the multi-viewpoint feature representation (e.g. view feature fusion data $604$) to perform 3D object detection. In certain aspects, the view detection head $606$ can be a neural network that produces the bounding box and class predictions $608$ (e.g., corresponding to an example of detected objects $324$). In certain aspects, additional cross-attention features can be incorporated from other sensors, which improve robustness and redundancy. For example, cross-attention features $610$ from another different input sensor could be provided to the view specific feature fuser $602$ to be fused, or concatenated, with cross-attended features generated from a different input sensor.

Figure 7A:
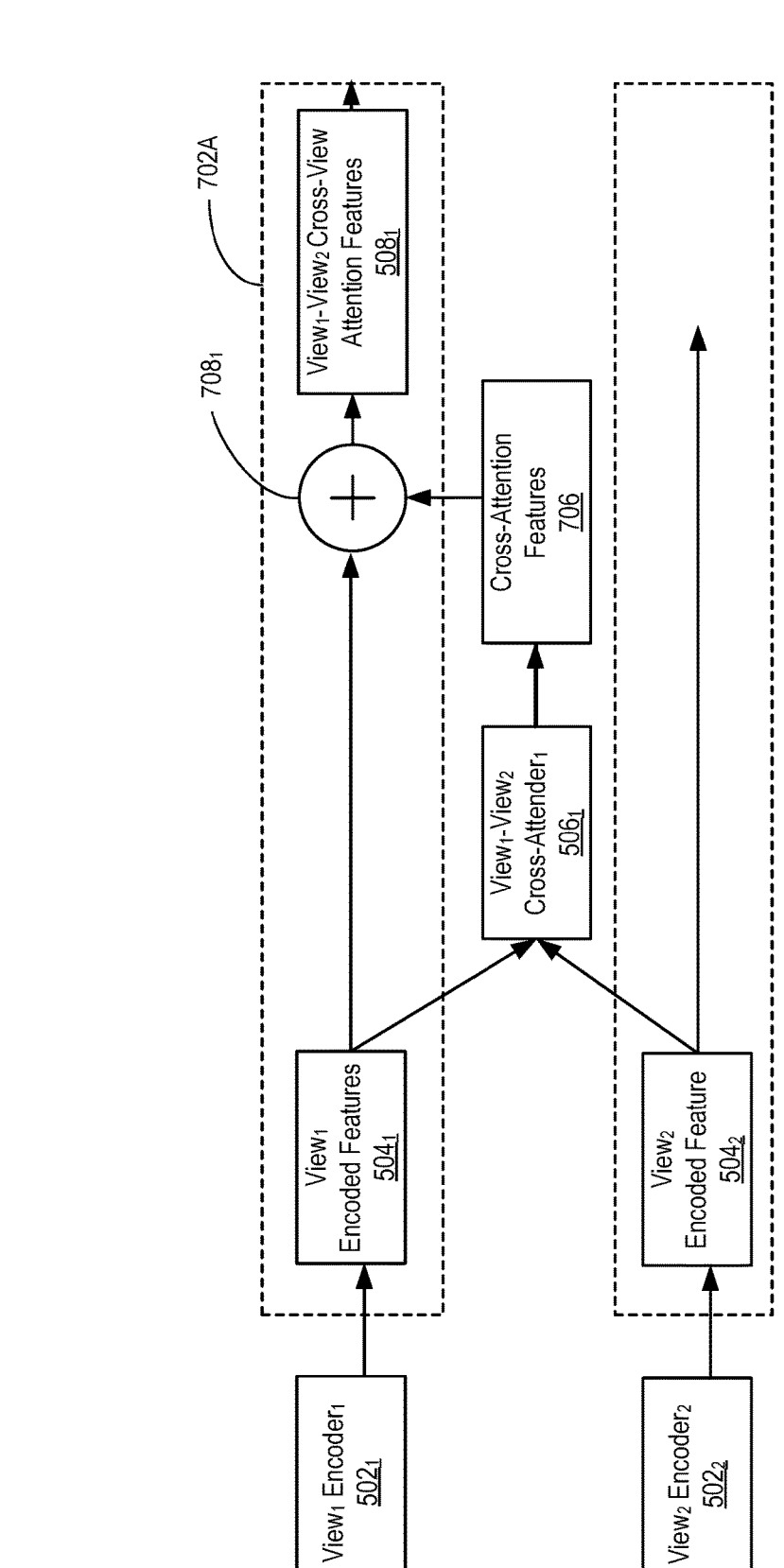

FIG. 7A illustrates details directed to applying cross-attention between encoded features from two distinct 2D views, in accordance with aspects of the present disclosure. In particular, FIG. 7A illustrates an example implementation of a cross-attention module $316$ of FIGS. 3A, 3B, and 5, according to certain aspects. In certain aspects, the specific view encoded features $504_1$ and $504_2$ are provided to the cross-attender $506_1$ which generates cross-attention features $706$ between view 1 (e.g., view$_1$ encoded features $504_1$) and view 2 (e.g., view$_2$ encoded features $504_2$). The cross-attention features $706$ from the two views are combined with the view 1 (e.g., view$_1$ encoded features $504_1$) via a feature combiner $708_1$. The specific fusion technique utilized by feature combiner $708_1$ can include additive fusion, concatenative fusion, convolutional fusion, or other combination methods. The resulting cross-view fusion features $508_1$ may provide enhanced representations to the downstream detection pipeline by consolidating complementary information from multiple 2D views of the 3D scene. In certain aspects, applying cross-attention between encoded features from two distinct 2D views can occur as part of the view encoder $502_1$ and/or be performed separately as a distinct and separate operation 702A. In certain aspects, cross-attention can be applied multiple times between the distinct 2D views.

Figure 7B:
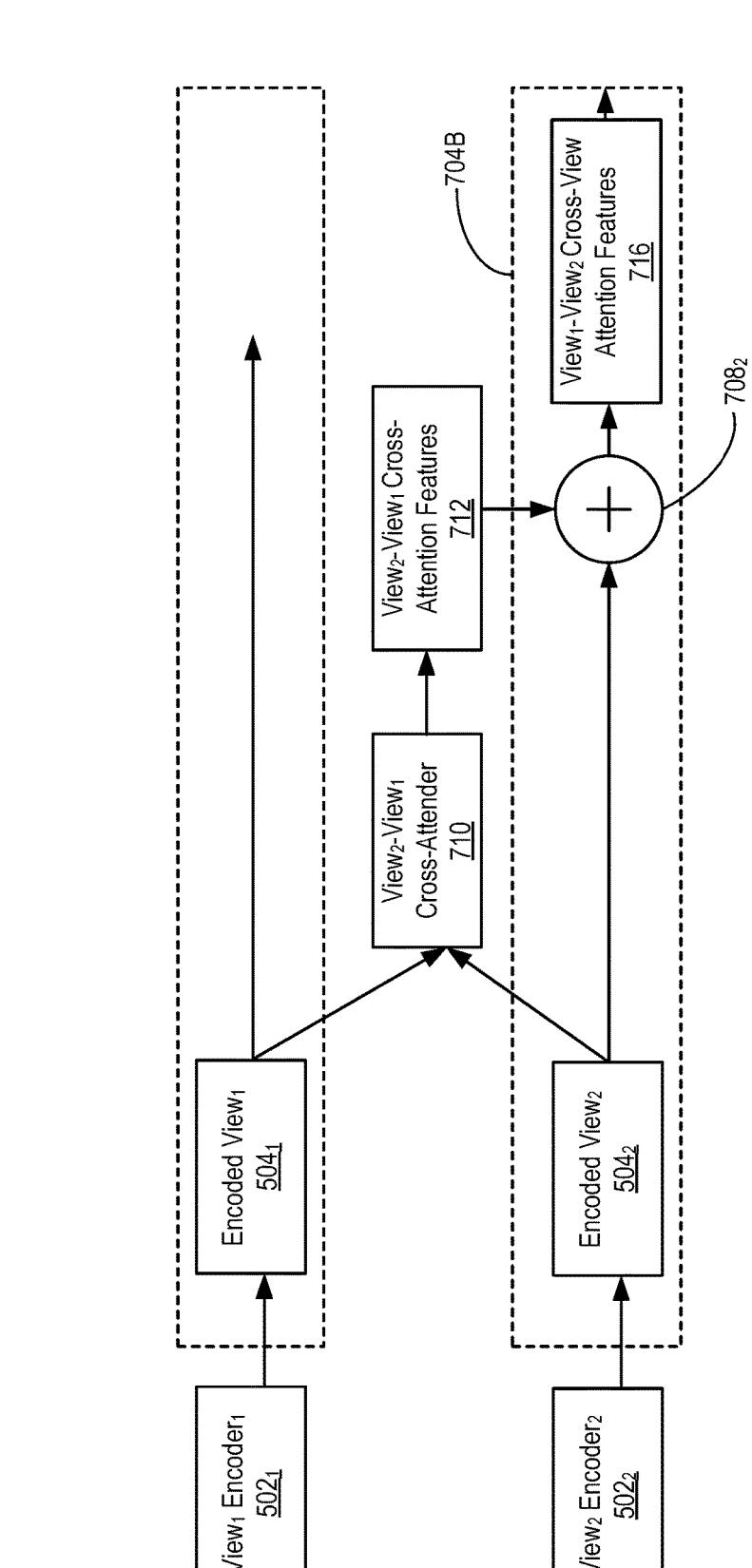

In certain aspects, the cross-attention may be performed bidirectionally. For example, view 1 features can attend to view 2 features, and vice versa, in an alternating fashion to enable rich cross-view context aggregation. For example, FIG. 7B illustrates details directed to an example of applying cross-attention between encoded features from two distinct 2D views in another direction. In particular, FIG. 7B illustrates an example implementation of a cross-attention module 316 of FIGS. 3A, 3B, and 5, according to certain aspects. In certain aspects, the specific view encoded features $504_1$ and $504_2$ are provided to the cross-attender 710 which generates cross-attention features 712 between view 2 (e.g., $view_2$ encoded features $504_2$) and view 1 (e.g., view encoded features $504_1$). The cross-attention features 712 from the two views are combined with the view 2 (e.g., $view_2$ encoded features $504_2$) via a feature combiner 7082. The specific fusion technique utilized by feature combiner 7082 can include additive fusion, concatenative fusion, convolutional fusion, or other combination methods. The resulting cross-view fusion features 716 may provide enhanced representations to the downstream detection pipeline by consolidating complementary information from multiple 2D views of the 3D scene. In certain aspects, applying cross-attention between encoded features from two distinct 2D views can occur as part of the view encoder $502_2$ and/or be performed separately as a distinct and separate operation 704B. In certain aspects, cross-attention can be applied multiple times between the distinct 2D views.

FIG. 7C illustrates details directed to applying dual cross-attention between encoded features from two distinct 2D views, in accordance with examples of the present disclosure. In particular, FIG. 7C illustrates an example implementation of a cross-attention module 316 of FIGS. 3A, 3B, and 5, according to certain aspects. In certain aspects, the specific view encoded features $504_1$ and $504_2$ are provided to the cross-attender $506_1$ which generates cross-attention features 706 between view 1 (e.g., $view_1$ encoded features $504_1$) and view 2 (e.g., $view_2$ encoded features $504_2$), such as with view 1 as query, and view 2 as key and value. The cross-attention features 706 from the two views are combined with the view 1 (e.g., $view_1$ encoded features $504_1$) via a feature combiner $708_1$. The specific fusion technique utilized by feature combiner $708_1$ can include additive fusion, concatenative fusion, convolutional fusion, or other combination methods. The resulting cross-view fusion features $508_1$ can be provided to the cross-attender 718 which generates cross-attention features 720 between view 2 (e.g., $view_2$ encoded features $504_2$) and view 1 (e.g., cross-view fusion features $508_1$), such as with view 2 as query, and view 1 as key and value. The cross-attention features 720 from the two views are combined with the view 2 (e.g., $view_2$ encoded features $504_2$) via a feature combiner $708_3$ and generate resulting cross-view fusion features 724. The specific fusion technique utilized by feature combiner $708_3$ can include additive fusion, concatenative fusion, convolutional fusion, or other combination methods. In certain aspects, applying cross-attention between encoded features from two distinct 2D views can occur as part of the view encoder $502_1$, $502_2$, and/or be performed separately as a distinct and separate operations 702C and/or 704C. In certain aspects, cross-attention can be applied multiple times between the distinct 2D views.

20

Figure 8:
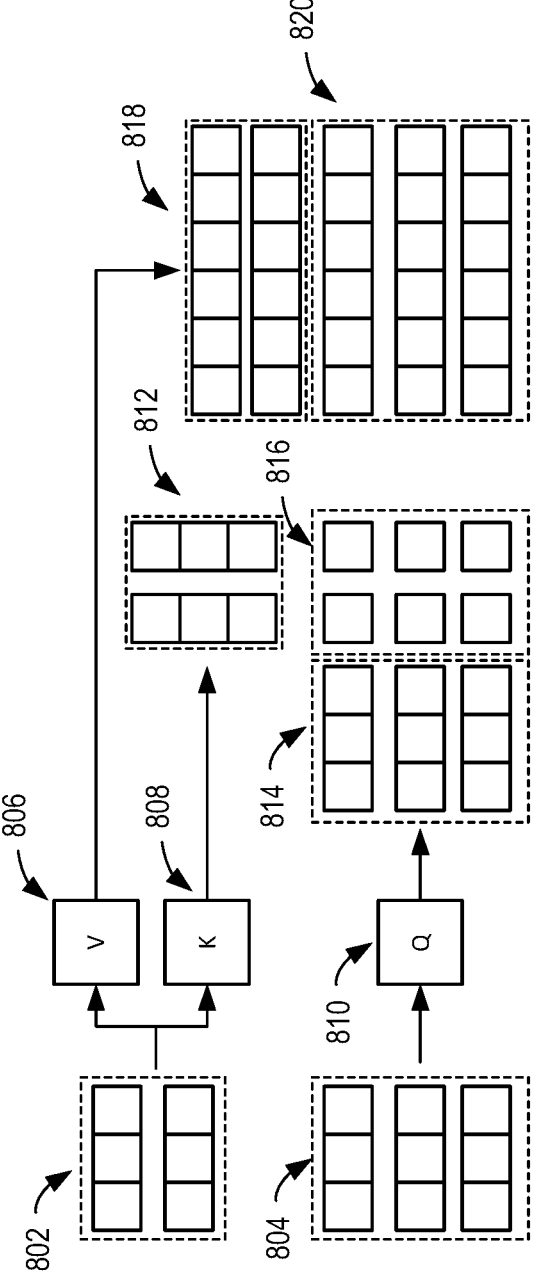
FIG. 8 depicts an example computation flow for generating cross-attention features between two data sets.

FIG. 8 illustrates an example computation flow for generating cross-attention features between two data sets, such as sequences 802 and 804, as an example, for example using a cross-attender 506, according to examples of the present disclosure. The first sequence 802 represents features from a first 2D view, such as encoded BEV features. The second sequence 804 represents features from a second 2D view, such as front view features. Cross-attention is applied to the sequences 802, 804 to allow bidirectional feature aggregation between the distinct views. As shown, value weights 806 are applied to the first sequence 802 to transform its features to value sequence 818. Key weights 808 are applied to the first sequence 802 to transform its features to key sequence 812. Query weights 810 are applied to the second sequence 804 to obtain query sequence 814. The key sequence 812 and query sequence 814 are compared, for instance using matrix multiplication, to generate an attention matrix 816. This provides scores representing the relevance between specific portions of the two sequences 802, 804. The attention matrix 816 is applied to the value sequence 818 to generate cross-attended feature sequence 820 that represent an aggregation of relevant features from the first sequence 802 based on the second sequence 804. The attention computation can also be performed bidirectionally to also attend the second sequence 804 features to the first sequence 802. The resulting cross-attention features 820 fuse information between the two distinct 2D view features.

Figure 9:
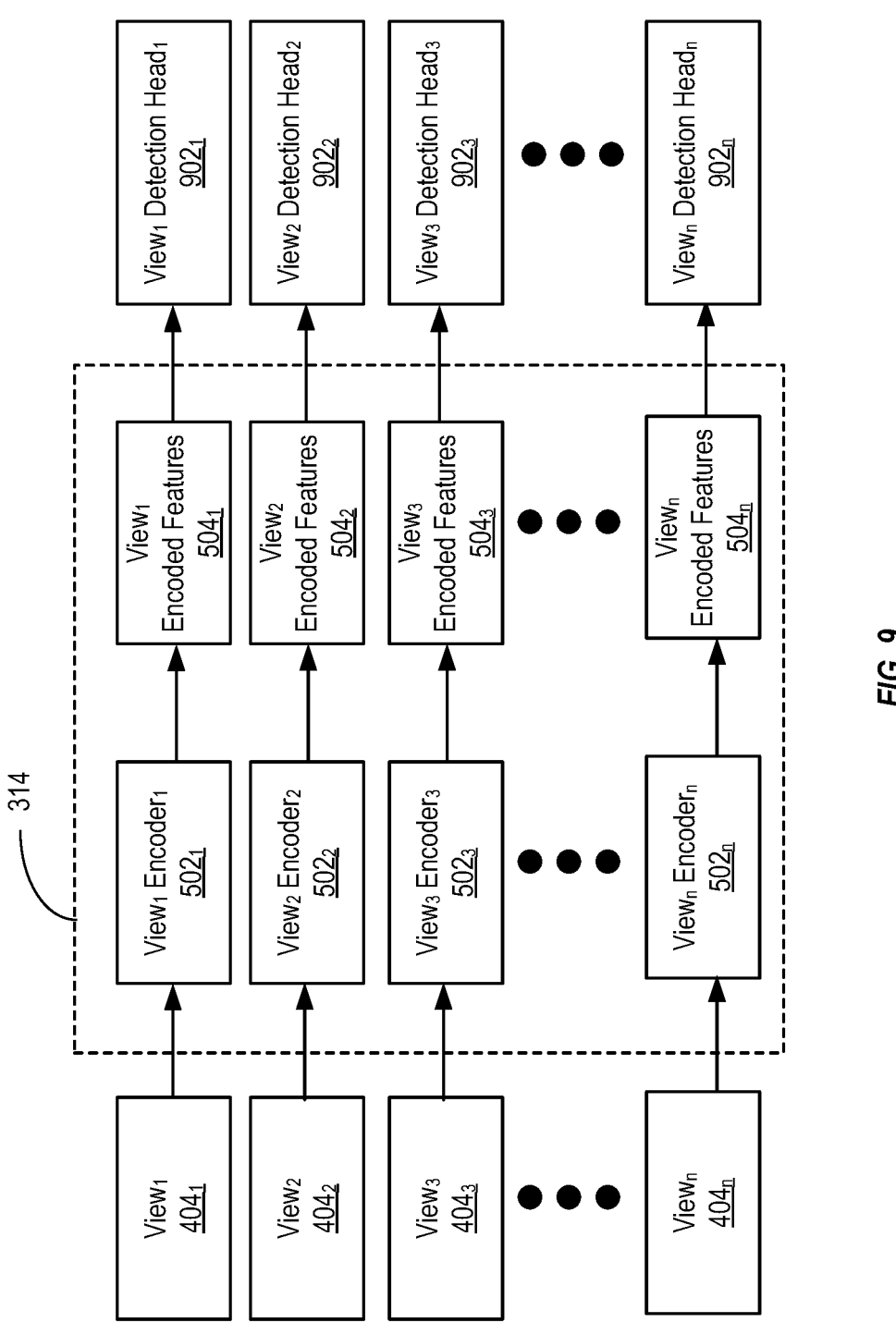
FIG. 9 depicts additional detail with respect to performing 3D object detection without utilizing cross-attention.

FIG. 9 depicts additional detail with respect to performing 3D object detection without utilizing cross-attention. In certain aspects, during training it may be advantageous to perform object detection based on view encoded features $504_1$-$504_n$. For example, view detection heads $902_1$-$902_n$ take the corresponding specific view encoded features $504_1$-$504_n$ as input to generate auxiliary detections such as bounding boxes, centroids, and object scores specifically for that view. The additional view-specific detection heads $902_1$-$902_n$ may provide intermediate supervision signals during training to boost performance, such as for challenging classes, before final fusion for birds-eye view detection.

Figure 10:
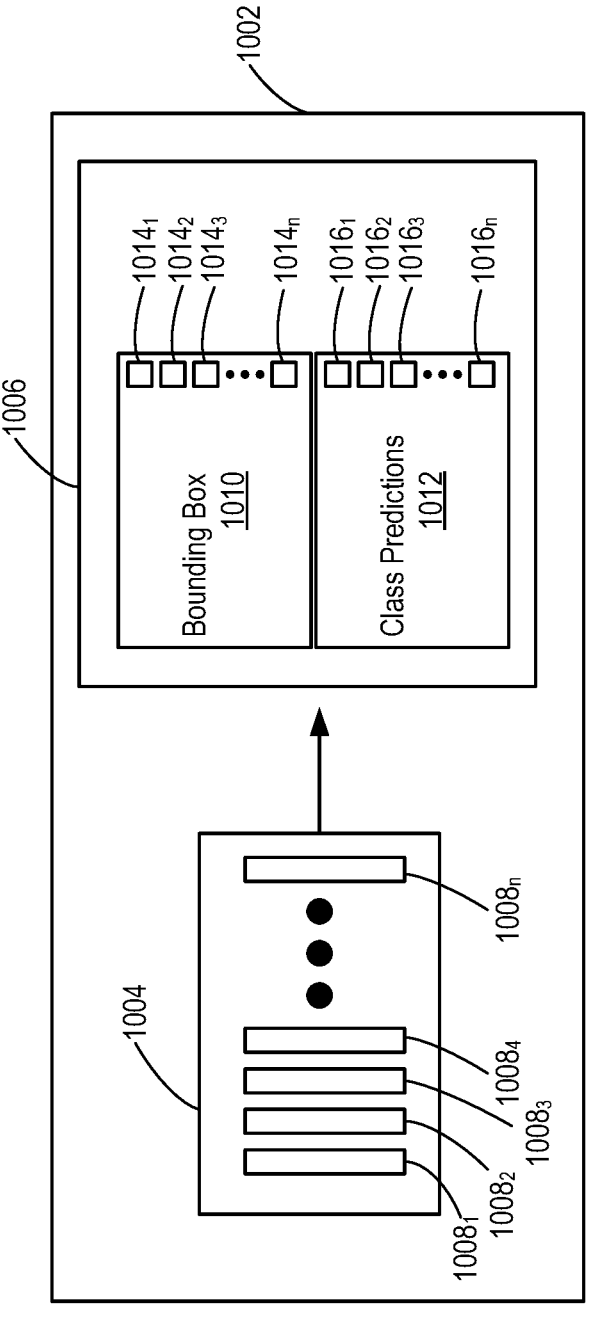
FIG. 10 depicts additional details with respect to a detection head for processing data to detect and classify objects.

FIG. 10 depicts additional details with respect to a detection head 1002 for processing image data to detect and classify objects therein. The detection head 1002 may be an example of detection head 322 of FIGS. 3A and 3B, and/or an example of detection heads $902_1$-$902_n$ of FIG. 9. The detection head 1002 initiates its operation with the generation of a plurality of "centerness heatmaps" $1008_1$-$1008_n$. These heatmaps $1008_1$-$1008_n$ may be produced by one or more convolutional neural networks (CNNs) or other suitable machine learning architectures. The term "centerness" is employed to indicate the propensity or likelihood of a particular spatial region of the heatmap to be the center of an object of interest. The dimensionality of these heatmaps is represented as $H_x \times W_y \times C$, where $H_x$ represents the height, $W_y$ represents the width, and C represents the number of potential object classes that the system is configured to detect. For each class-specific channel or heatmap $1008_1$-$1008_n$, high activation values are indicative of the probable central regions of objects corresponding to that class. In certain aspects, these heatmaps $1008_1$-$1008_n$ might be generated using modes such as Gaussian modes to better represent object centers, ensuring that the peak of the activation is at the exact center, tapering off as one moves away from the center.

Upon generation of the centerness heatmaps $1008_1$-$1008_n$, they are subsequently provided as inputs to a secondary neural network module depicted as 1006. This neural network module 1006 is specialized to produce both bounding box predictions and class predictions, though in other aspects, it may produce one or the other. The neural network module 1006 may utilize architectures such as faster region based convolutional neural networks (R-CNN), You Only Look Once X (YOLOX), or any other suitable object detection frameworks. In certain aspects, regression techniques can be applied to refine the spatial coordinates of the bounding boxes, ensuring more accurate object localization.

The bounding box predictions are represented collectively at 1010, with individual predictions enumerated as $1014_1$-$1014_n$. Each bounding box (e.g., $1014_1$) delineates the spatial confines of a detected object within the input image. The central coordinates of these bounding boxes are influenced heavily by the aforementioned centerness heatmaps $1008_1$-$1008_n$, ensuring that the bounding boxes are appropriately centered on the detected objects. In certain aspects, anchor boxes or reference boxes of various scales and aspect ratios might be used in conjunction with the centerness heatmap activations to generate these bounding boxes.

Class predictions are generated and depicted at 1012. Individual class predictions are enumerated as $1016_1$-$1016_n$. Each class prediction (e.g., $1016_1$) corresponds to a bounding box prediction, denoting the category or type of object enclosed by that bounding box. Advanced classification techniques, potentially involving softmax layers or the like, might be employed to determine the most probable class for each detected object.

Figure 11:
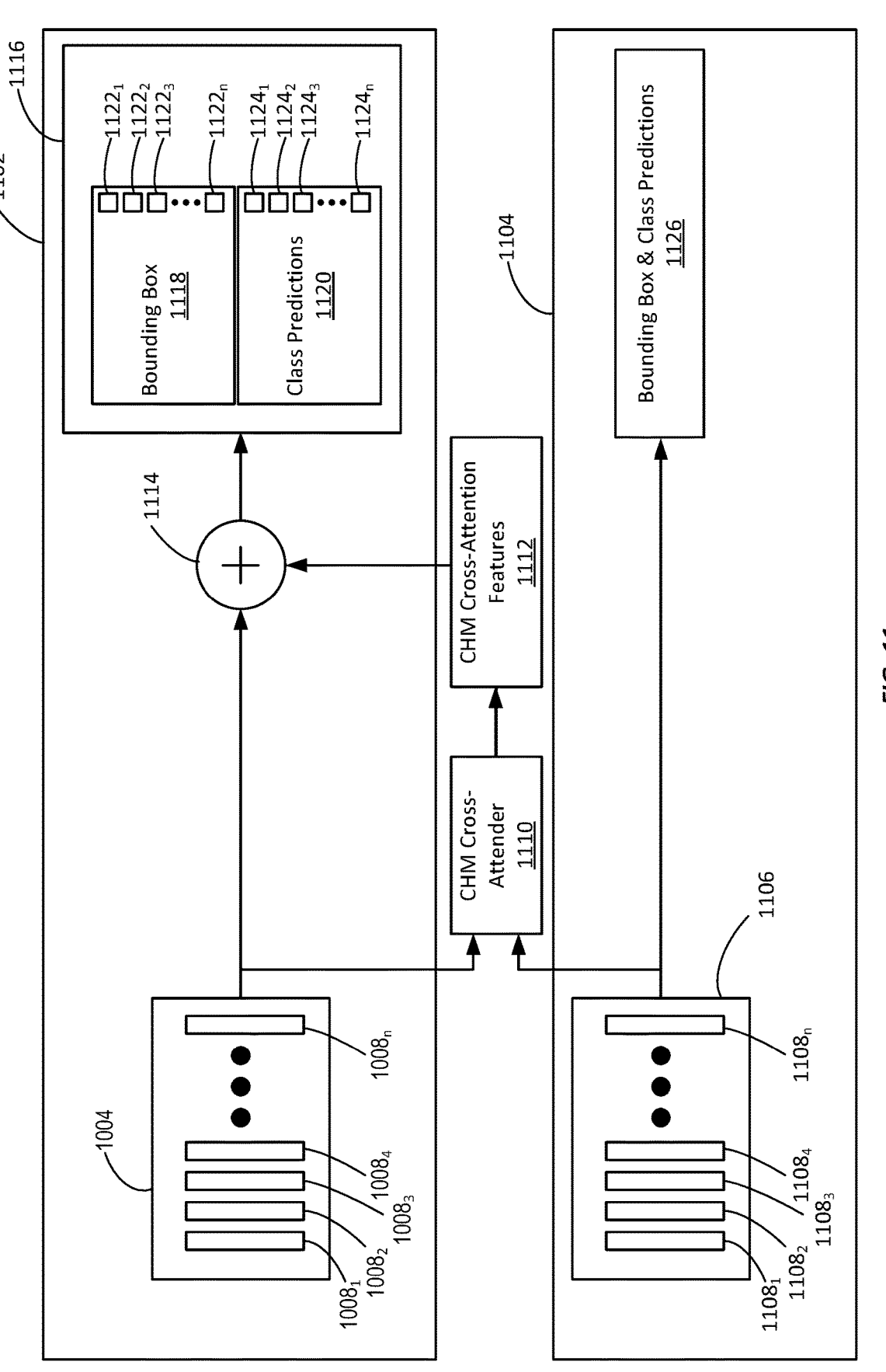
FIG. 11 depicts additional details with respect to a second detection head for processing data to detect and classify objects.

FIG. 11 depicts additional details with respect to a detection head 1102 and a detection head 1104 for processing image data to detect and classify objects therein. The detection head 1102 may be an example of detection head 322 of FIGS. 3A and 3B. The detection head 1104 may be an example of detection heads $902_1$-$902_n$ of FIG. 9. The detection head 1102 generates centerness heatmaps $1008_1$-$1008_n$ as previously described in FIG. 10. Similarly, view detection head 1104 generates centerness heatmaps $1108_1$-$1108_n$. In certain aspects, a centerness heatmap cross-attender 1110 can generate centerness heatmap cross-attention features 1112 which may provide relationships and dependencies between different regions of individual centerness heatmaps $1008_1$-$1008_n$ and other centerness heatmaps $1108_1$-$1108_n$, identifying patterns or similarities which might be obscure when viewed in isolation. In certain aspects, the centerness heatmap cross-attention features 1112 represent the enhanced information acquired from cross-attending the initial centerness heatmaps $1008_1$-$1008_n$, effectively allowing each region of a heatmap to "attend" to every other region, thereby discerning spatial relationships and dependencies which may be helpful for accurate object detection.

Following the cross-attention operation, the centerness heatmap cross-attention features 1112 are combined with the original centerness heatmaps $1008_1$-$1008_n$ via an aggregation operation, denoted by the '+' symbol at 1114. In certain aspects, this aggregation helps the output retains the original centerness information while being augmented with insights from the cross-attention mechanism. The aggregated features are then channeled into a secondary neural network module or an equivalent processing structure shown at 1116. This module 1116, receiving enriched data, is designed to generate bounding box and/or class predictions, such as with heightened accuracy.

The bounding box predictions are collectively represented at 1118, with individual predictions enumerated as $1122_1$-$1122_n$. These predictions, driven by the aggregated features, delineate the spatial confines of detected objects in the input image, such as with a heightened accuracy attributable to the enhanced heatmap data. In certain aspects, concurrent with bounding box predictions, class predictions 1120 are generated. Individual class predictions are enumerated as $1124_1$-$1124_n$. Each prediction signifies the category or class of the object encapsulated by its corresponding bounding box. In certain aspects, the other bounding box and class predictions 1126 can be made base on view specific centerness heatmaps $1108_1$-$1108_n$.

Certain aspects described herein may be implemented, at least in part, using some form of artificial intelligence (AI), e.g., the process of using a machine learning (ML) model to infer or predict output data based on input data. An example ML model may include a mathematical representation of one or more relationships among various objects to provide an output representing one or more predictions or inferences. Once an ML model has been trained, the ML model may be deployed to process data that may be similar to, or associated with, all or part of the training data and provide an output representing one or more predictions or inferences based on the input data.

ML is often characterized in terms of types of learning that generate specific types of learned models that perform specific types of tasks. For example, different types of machine learning include supervised learning, unsupervised learning, semi-supervised learning, and reinforcement learning.

Supervised learning algorithms generally model relationships and dependencies between input features (e.g., a feature vector) and one or more target outputs. Supervised learning uses labeled training data, which are data including one or more inputs and a desired output. Supervised learning may be used to train models to perform tasks like classification, where the goal is to predict discrete values, or regression, where the goal is to predict continuous values. Some example supervised learning algorithms include nearest neighbor, naive Bayes, decision trees, linear regression, support vector machines (SVMs), and artificial neural networks (ANNs).

Unsupervised learning algorithms work on unlabeled input data and train models that take an input and transform it into an output to solve a practical problem. Examples of unsupervised learning tasks are clustering, where the output of the model may be a cluster identification, dimensionality reduction, where the output of the model is an output feature vector that has fewer features than the input feature vector, and outlier detection, where the output of the model is a value indicating how the input is different from a typical example in the dataset. An example unsupervised learning algorithm is k-Means.

Semi-supervised learning algorithms work on datasets containing both labeled and unlabeled examples, where often the quantity of unlabeled examples is much higher than the number of labeled examples. However, the goal of a semi-supervised learning is that of supervised learning. Often, a semi-supervised model includes a model trained to produce pseudo-labels for unlabeled data that is then combined with the labeled data to train a second classifier that leverages the higher quantity of overall training data to improve task performance.

Reinforcement Learning algorithms use observations gathered by an agent from an interaction with an environment to take actions that may maximize a reward or minimize a risk. Reinforcement learning is a continuous and iterative process in which the agent learns from its experiences with the environment until it explores, for example, a full range of possible states. An example type of reinforcement learning algorithm is an adversarial network. Reinforcement learning may be particularly beneficial when used to improve or attempt to optimize a behavior of a model deployed in a dynamically changing environment, such as a wireless communication network.

ML models may be deployed in one or more devices (e.g., network entities such as base station(s) and/or user equipment(s)) to support various wired and/or wireless communication aspects of a communication system. For example, an ML model may be trained to identify patterns and relationships in data corresponding to a network, a device, an air interface, or the like. An ML model may improve operations relating to one or more aspects, such as transceiver circuitry controls, frequency synchronization, timing synchronization, channel state estimation, channel equalization, channel state feedback, modulation, demodulation, device positioning, transceiver tuning, beamforming, signal coding/decoding, network routing, load balancing, and energy conservation (to name just a few) associated with communications devices, services, and/or networks. AI-enhanced transceiver circuitry controls may include, for example, filter tuning, transmit power controls, gain controls (including automatic gain controls), phase controls, power management, and the like.

Aspects described herein may describe the performance of certain tasks and the technical solution of various technical problems by application of a specific type of ML model, such as an ANN or CNN. It should be understood, however, that other type(s) of ML models may be used in addition to or instead of an ANN or CNN. Hence, unless expressly recited, subject matter regarding an ML model is not necessarily intended to be limited to just an ANN or CNN solution. Further, it should be understood that, unless otherwise specifically stated, terms such "AI model," "ML model," "AI/ML model," "trained ML model," and the like are intended to be interchangeable.

Figure 12:
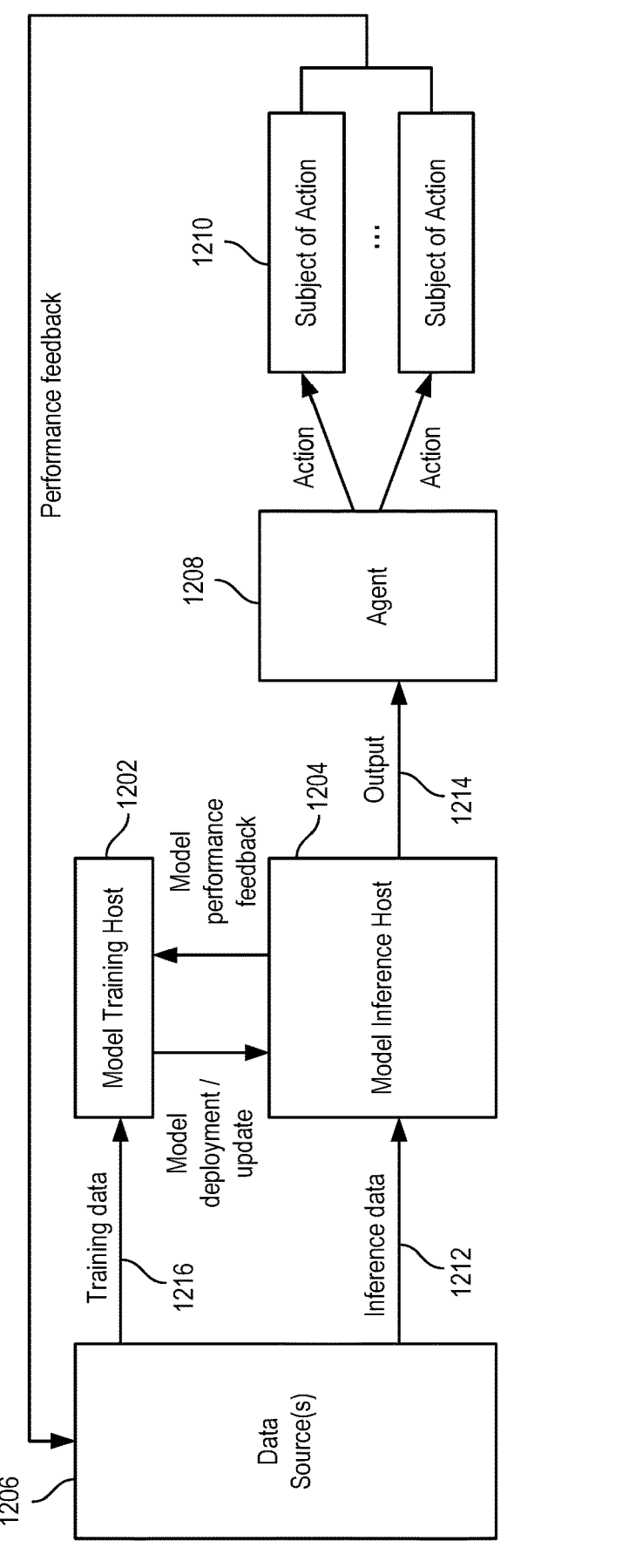
FIG. 12 depicts a diagram illustrating an example artificial intelligence (AI) architecture that may be used for implementing one or more machine learning (ML) models.

FIG. 12 is a diagram illustrating an example AI architecture 1200 that may be used for implementing one or more ML models. As illustrated, the architecture 1200 includes multiple logical entities, such as a model training host 1202, a model inference host 1204, data source(s) 1206, and an agent 1208. The AI architecture may be used in any of various use cases for wireless communications, such as those listed above.

The model inference host 1204, in the architecture 1200, is configured to run an ML model based on inference data 1212 provided by data source(s) 1206. The model inference host 1204 may produce an output 1214 (e.g., a prediction or inference, such as a discrete or continuous value) based on the inference data 1212, that is then provided as input to the agent 1208. The type of agent 1208 may be depend on the type of tasks performed by the model inference host 1204, the type of inference data 1212 provided to model inference host 1204, and/or the type of output 1214 produced by model inference host 1204.

The data sources 1206 may be configured for collecting data that is used as training data 1216 for training an ML model, or as inference data 1212 for feeding an ML model inference operation. In particular, the data sources 1206 may collect data from any of various entities (e.g., LiDAR point clouds, image sensors, etc.), which may include the subject of action 1210, and provide the collected data to a model training host 1202 for ML model training. In some examples, if the output 1214 provided to agent 1208 is inaccurate (or the accuracy is below an accuracy threshold), the model training host 1202 may determine to modify or retrain the ML model used by model inference host 1204, such as via an ML model deployment/update.

In certain aspects, the model training host 1202 may deployed at or with the same or a different entity than that in which the model inference host 1204 is deployed. For example, in order to offload model training processing, which can impact the performance of the model inference host 1204, the model training host 1202 may be deployed at a model server as further described herein. Further, in some cases, training and/or inference may be distributed amongst devices in a decentralized or federated fashion.

Figure 13:
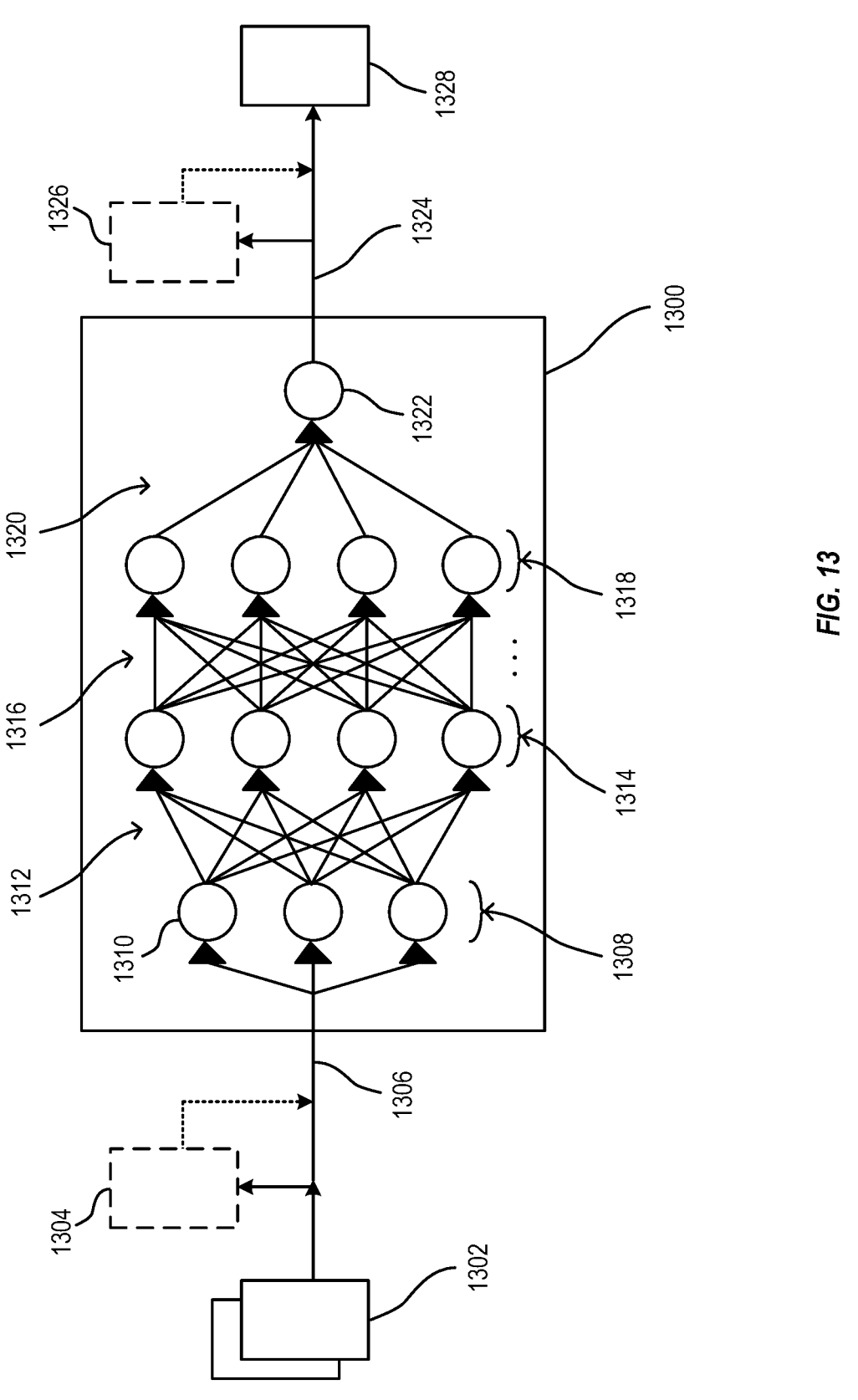
FIG. 13 depicts an illustrative block diagram of an example artificial neural network (ANN) according to examples of the present disclosure.

FIG. 13 is an illustrative block diagram of an example artificial neural network (ANN) 1300.

ANN 1300 may receive input data 1306 which may include one or more bits of data 1302, pre-processed data output from pre-processor 1304 (optional), or some combination thereof. Here, data 1302 may include training data, verification data, application-related data, or the like, e.g., depending on the stage of development and/or deployment of ANN 1300. Pre-processor 1304 may be included within ANN 1300 in some other implementations. Pre-processor 1304 may, for example, process all or a portion of data 1302 which may result in some of data 1302 being changed, replaced, deleted, etc. In some implementations, pre-processor 1304 may add additional data to data 1302.

ANN 1300 includes at least one first layer 1308 of artificial neurons 1310 to process input data 1306 and provide resulting first layer output data via edges 1312 to at least a portion of at least one second layer 1314. Second layer 1314 processes data received via edges 1312 and provides second layer output data via edges 1316 to at least a portion of at least one third layer 1318. Third layer 1318 processes data received via edges 1316 and provides third layer output data via edges 1320 to at least a portion of a final layer 1322 including one or more neurons to provide output data 1324. All or part of output data 1324 may be further processed in some manner by (optional) post-processor 1326. Thus, in certain examples, ANN 1300 may provide output data 1328 that is based on output data 1324, post-processed data output from post-processor 1326, or some combination thereof. Post-processor 1326 may be included within ANN 1300 in some other implementations. Post-processor 1326 may, for example, process all or a portion of output data 1324 which may result in output data 1328 being different, at least in part, to output data 1324, e.g., as result of data being changed, replaced, deleted, etc. In some implementations, post-processor 1326 may be configured to add additional data to output data 1324. In this example, second layer 1314 and third layer 1318 represent intermediate or hidden layers that may be arranged in a hierarchical or other like structure. Although not explicitly shown, there may be one or more further intermediate layers between the second layer 1314 and the third layer 1318.

The structure and training of artificial neurons 1310 in the various layers may be tailored to specific requirements of an application. Within a given layer of an ANN, some or all of the neurons may be configured to process information provided to the layer and output corresponding transformed information from the layer. For example, transformed information from a layer may represent a weighted sum of the input information associated with or otherwise based on a non-linear activation function or other activation function used to "activate" artificial neurons of a next layer. Artificial neurons in such a layer may be activated by or be responsive to weights and biases that may be adjusted during a training process. Weights of the various artificial neurons may act as parameters to control a strength of connections between layers or artificial neurons, while biases may act as parameters to control a direction of connections between the layers or artificial neurons. An activation function may select or determine whether an artificial neuron transmits its output to the next layer or not in response to its received data. Different activation functions may be used to model different types of non-linear relationships. By introducing non-linearity into an ML model, an activation function allows the ML model to "learn" complex patterns and relationships in the input data. Some non-exhaustive example activation functions include a linear function, binary step function, sigmoid, tanh, ReLU and variants, exponential linear unit (ELU), Swish, Softmax, and others.

Design tools (such as computer applications, programs, etc.) may be used to select appropriate structures for ANN 1300 and a number of layers and a number of artificial neurons in each layer, as well as selecting activation functions, a loss function, training processes, etc. Once an initial model has been designed, training of the model may be conducted using training data. Training data may include one or more datasets within which ANN 1300 may detect, determine, identify or ascertain patterns. Training data may represent various types of information, including written, visual, audio, environmental context, operational properties, etc. During training, parameters of artificial neurons 1310 may be changed, such as to minimize or otherwise reduce a loss function or a cost function. A training process may be repeated multiple times to fine-tune ANN 1300 with each iteration.

Various ANN model structures are available for consideration. For example, in a feedforward ANN structure each artificial neuron 1310 in a layer receives information from the previous layer and likewise produces information for the next layer. In a convolutional ANN structure, some layers may be organized into filters that extract features from data (e.g., training data and/or input data). In a recurrent ANN structure, some layers may have connections that allow for processing of data across time, such as for processing information having a temporal structure, such as time series data forecasting.

In an autoencoder ANN structure, compact representations of data may be processed and the model trained to predict or potentially reconstruct original data from a reduced set of features. An autoencoder ANN structure may be useful for tasks related to dimensionality reduction and data compression.

A generative adversarial ANN structure may include a generator ANN and a discriminator ANN that are trained to compete with each other. Generative-adversarial networks (GANs) are ANN structures that may be useful for tasks relating to generating synthetic data or improving the performance of other models.

A transformer ANN structure makes use of attention mechanisms that may enable the model to process input sequences in a parallel and efficient manner. An attention mechanism allows the model to focus on different parts of the input sequence at different times. Attention mechanisms may be implemented using a series of layers known as attention layers to compute, calculate, determine or select weighted sums of input features based on a similarity between different elements of the input sequence. A transformer ANN structure may include a series of feedforward ANN layers that may learn non-linear relationships between the input and output sequences. The output of a transformer ANN structure may be obtained by applying a linear transformation to the output of a final attention layer. A transformer ANN structure may be of particular use for tasks that involve sequence modeling, or other like processing.

Another example type of ANN structure, is a model with one or more invertible layers. Models of this type may be inverted or "unwrapped" to reveal the input data that was used to generate the output of a layer.

Other example types of ANN model structures include fully connected neural networks (FCNNs) and long short-term memory (LSTM) networks.

ANN 1300 or other ML models may be implemented in various types of processing circuits along with memory and applicable instructions therein, for example, as described herein with respect to FIGS. 3A-12. For example, general-purpose hardware circuits, such as, such as one or more central processing units (CPUs) and one or more graphics processing units (GPUs) may be employed to implement a model. One or more ML accelerators, such as tensor processing units (TPUs), embedded neural processing units (eNPUs), or other special-purpose processors, and/or field-programmable gate arrays (FPGAs), application-specific integrated circuits (ASICs), or the like also may be employed. Various programming tools are available for developing ANN models.

There are a variety of model training techniques and processes that may be used prior to, or at some point following, deployment of an ML model, such as ANN 1300 of FIG. 13.

As part of a model development process, information in the form of applicable training data may be gathered or otherwise created for use in training an ML model accordingly. Once an ML model has been trained with training data, its performance may be evaluated. In some scenarios, evaluation/verification tests may use a validation dataset, which may include data not in the training data, to compare the model's performance to baseline or other benchmark information. If model performance is deemed unsatisfactory, it may be beneficial to fine-tune the model, e.g., by changing its architecture, re-training it on the data, or using different optimization techniques, etc. Once a model's performance is deemed satisfactory, the model may be deployed accordingly. In certain instances, a model may be updated in some manner, e.g., all or part of the model may be changed or replaced, or undergo further training, just to name a few examples.

As part of a training process for an ANN, such as ANN 1300 of FIG. 13, parameters affecting the functioning of the artificial neurons and layers may be adjusted. For example, backpropagation techniques may be used to train the ANN by iteratively adjusting weights and/or biases of certain artificial neurons associated with errors between a predicted output of the model and a desired output that may be known or otherwise deemed acceptable. Backpropagation may include a forward pass, a loss function, a backward pass, and a parameter update that may be performed in training iteration. The process may be repeated for a certain number of iterations for each set of training data until the weights of the artificial neurons/layers are adequately tuned.

Backpropagation techniques associated with a loss function may measure how well a model is able to predict a desired output for a given input. An optimization algorithm may be used during a training process to adjust weights and/or biases to reduce or minimize the loss function which should improve the performance of the model. There are a variety of optimization algorithms that may be used along with backpropagation techniques or other training techniques. Some initial examples include a gradient descent based optimization algorithm and a stochastic gradient descent based optimization algorithm. A stochastic gradient descent (or ascent) technique may be used to adjust weights/ biases in order to minimize or otherwise reduce a loss function. A mini-batch gradient descent technique, which is a variant of gradient descent, may involve updating weights/biases using a small batch of training data rather than the entire dataset. A momentum technique may accelerate an optimization process by adding a momentum term to update or otherwise affect certain weights/biases.

An adaptive learning rate technique may adjust a learning rate of an optimization algorithm associated with one or more characteristics of the training data. A batch normalization technique may be used to normalize inputs to a model in order to stabilize a training process and potentially improve the performance of the model.

A "dropout" technique may be used to randomly drop out some of the artificial neurons from a model during a training process, e.g., in order to reduce overfitting and potentially improve the generalization of the model.

An "early stopping" technique may be used to stop an on-going training process early, such as when a performance of the model using a validation dataset starts to degrade.

Another example technique includes data augmentation to generate additional training data by applying transformations to all or part of the training information.

A transfer learning technique may be used which involves using a pre-trained model as a starting point for training a new model, which may be useful when training data is limited or when there are multiple tasks that are related to each other.

A multi-task learning technique may be used which involves training a model to perform multiple tasks simultaneously to potentially improve the performance of the model on one or more of the tasks. Hyperparameters or the like may be input and applied during a training process in certain instances.

Another example technique that may be useful with regard to an ML model is some form of a "pruning" technique. A pruning technique, which may be performed during a training process or after a model has been trained, involves the removal of unnecessary (e.g., because they have no impact on the output) or less necessary (e.g., because they have negligible impact on the output), or possibly redundant features from a model. In certain instances, a pruning technique may reduce the complexity of a model or improve efficiency of a model without undermining the intended performance of the model.

Pruning techniques may be particularly useful in the context of wireless communication, where the available resources (such as power and bandwidth) may be limited. Some example pruning techniques include a weight pruning technique, a neuron pruning technique, a layer pruning technique, a structural pruning technique, and a dynamic pruning technique. Pruning techniques may, for example, reduce the amount of data corresponding to a model that may need to be transmitted or stored.

Weight pruning techniques may involve removing some of the weights from a model. Neuron pruning techniques may involve removing some neurons from a model. Layer pruning techniques may involve removing some layers from a model. Structural pruning techniques may involve removing some connections between neurons in a model. Dynamic pruning techniques may involve adapting a pruning strategy of a model associated with one or more characteristics of the data or the environment. For example, in certain wireless communication devices, a dynamic pruning technique may more aggressively prune a model for use in a low-power or low-bandwidth environment, and less aggressively prune the model for use in a high-power or high-bandwidth environment. In certain aspects, pruning techniques also may be applied to training data, e.g., to remove outliers, etc. In some implementations, pre-processing techniques directed to all or part of a training dataset may improve model performance or promote faster convergence of a model. For example, training data may be pre-processed to change or remove unnecessary data, extraneous data, incorrect data, or otherwise identifiable data. Such pre-processed training data may, for example, lead to a reduction in potential overfitting, or otherwise improve the performance of the trained model.

One or more of the example training techniques presented above may be employed as part of a training process. As above, some example training processes that may be used to train an ML model include supervised learning, unsupervised learning, semi-supervised learning, and reinforcement learning technique.

Decentralized, distributed, or shared learning, such as federated learning, may enable training on data distributed across multiple devices or organizations, without the need to centralize data or the training. Federated learning may be particularly useful in scenarios where data is sensitive or subject to privacy constraints, or where it is impractical, inefficient, or expensive to centralize data. In the context of wireless communication, for example, federated learning may be used to improve performance by allowing an ML model to be trained on data collected from a wide range of devices and environments. For example, an ML model may be trained on data collected from a large number of wireless devices in a network, such as distributed wireless communication nodes, smartphones, or internet-of-things (IoT) devices, to improve the network's performance and efficiency. With federated learning, a device may receive a copy of all or part of a model and perform local training on such copy of all or part of the model using locally available training data. Such a device may provide update information (e.g., trainable parameter gradients) regarding the locally trained model to one or more other devices (such as a network entity or a server) where the updates from other-like devices may be aggregated and used to provide an update to a shared model or the like. A federated learning process may be repeated iteratively until all or part of a model obtains a satisfactory level of performance. Federated learning may enable devices to protect the privacy and security of local data, while supporting collaboration regarding training and updating of all or part of a shared model.

FIG. 14 depicts an example method 1400 of performing multi-2D-viewpoint 3D object detection using cross-attention between multiple views. In one aspect, method 1400 can be implemented by any of the multi-2D-viewpoint 3D object detection systems described herein, such as with respect to FIGS. 3A-11.

Method 1400 starts at block 1402 with obtaining a first set of features based on a first 2D view of a scene corresponding to a first viewpoint. In certain aspects, to obtain the first set of features, the first 2D view can be processed through a first encoder.

The method 1400 continues to block 1404 with obtaining a second set of features based on a second 2D view of the scene corresponding to a second viewpoint, where the first and second views are based on input from a first input sensor. In certain aspects, to obtain the second set of features, the second 2D view can be processed through a second encoder. In certain aspects, the first sensor can be a LiDAR sensor and the second sensor can be an image sensor. In certain aspects, a 3D scene representation can be transformed to generate the first and second 2D views. The first view may be a bird's eye view and the second view a front view.

The method 1400 continues to block 1406 with obtaining a third set of features based on a third 2D view corresponding to a third viewpoint. The method 1400 continues to block 1408 with obtaining a fourth set of features based on a fourth 2D view corresponding to a fourth viewpoint, where the third and fourth views are based on input from a second sensor.

The method 1400 continues to block 1410 with performing cross-attention between the first and second sets of features to obtain a first set of cross-attended features. In certain aspects, cross-attention can be performed bidirectionally between the two views and in certain aspects, applied multiple times.

The method 1400 continues to block 1412 with performing cross-attention between the third and fourth sets of features to obtain a second set of cross-attended features.

The method 1400 continues at block 1414 with performing 3D object detection in the scene based on at least the first and second sets of cross-attended features, such as fusing information from distinct sensors and views. In certain aspects, the cross-attended features can be fused to obtain a set of fused features for detection. In certain aspects, additional views can be incorporated. In certain aspects, for detection, centerness heatmaps can be generated and cross-attended.

Note that FIG. 14 is just one example of a method, and other methods including fewer, additional, or alternative steps are possible consistent with this disclosure.

FIG. 15 depicts an example method 1500 of performing 3D object detection using cross-attention between centerness heatmaps. In one aspect, method 1500 can be implemented by any multi-2D-viewpoint 3D object detection systems described herein, such as with respect to FIGS. 3A-11. For example, method 1500 may be implemented by the detection heads of FIG. 11.

Method 1500 starts at block 1502 with obtaining a first set of features based on a first 2D view of a scene corresponding to a first viewpoing. In certain aspects, the first set of features can be obtained by processing the first view through an encoder.

The method 1500 continues to block 1504 with obtaining a second set of features based on a second 2D view of the scene corresponding to a second viewpoint. In certain aspects, the second set of features can be obtained by processing the second view through an encoder.

The method 1500 continues to block 1506 with generating a first centerness heatmap for an object class based on the first set of features.

The method 1500 continues to block 1508 with generating a second centerness heatmap for the object class based on the second set of features.

The method 1500 continues to block 1510 with performing cross-attention between the first and second centerness heatmaps to obtain a first set of cross-attended features. In certain aspects, cross-attention can be applied bidirectionally, and in certain aspects, multiple times between the heatmaps.

The method 1500 concludes at block 1512 with performing 3D object detection in the scene based on the cross-attended features between the centerness heatmaps. In certain aspects, additional detection can be performed based on the individual heatmaps.

Note that FIG. 15 is just one example of a method, and other methods including fewer, additional, or alternative steps are possible consistent with this disclosure.

Example Processing System for Performing Multi-2D-Viewpoint 3D Object Detection Using Cross-Attention FIG. 16 depicts aspects of an example processing system 1600.

The processing system 1600 includes a processing system 1602 includes one or more processors 1620. The one or more processors 1620 are coupled to a computer-readable medium/memory 1630 via a bus 1606. In certain aspects, the computer-readable medium/memory 1630 is configured to store instructions (e.g., computer-executable code) that when executed by the one or more processors 1620, cause the one or more processors 1620 to perform the method 1400 and/or the method 1500 described with respect to FIGS. 14-15, or any aspect related to it, including any additional steps or sub-steps described in relation to FIGS. 14-15.

In the depicted example, computer-readable medium/memory 1630 stores code (e.g., executable instructions) for obtaining features based on first, second, third, and fourth 2D views 1631, code for performing cross-attention 1632, code for performing 3D object detection 1633, and code for generating centerness heatmaps 1634. Processing of the code 1631-1634 may enable and cause the processing system 1600 to perform the method 1400 and/or the method 1500 described with respect to FIGS. 14-15, or any aspect related to it.

The one or more processors 1620 include circuitry configured to implement (e.g., execute) the code stored in the computer-readable medium/memory 1630, including circuitry for obtaining features based on first, second, third, and fourth 2D view 1621, circuitry for performing cross-attention 1622, circuitry for performing 3D object detection 1623, and circuitry for generating centerness heatmaps 1624. Processing with circuitry 1621-1624 may enable and cause the processing system 1600 to perform the method 1400 and/or the method 1500 described with respect to FIGS. 14-15, or any aspect related to it.

Figure 17:
FIG. 17 depicts an example system for gating 2D views utilized for performing multi-2D-viewpoint 3D object detection.

FIG. 17 illustrates a system 1700 for gating 2D views utilized for performing multi-2D-viewpoint 3D object detection in accordance with examples of the present disclosure. In certain aspects, one or more components of system 1700 may be implemented or run on one or more processors, which may be coupled to one or more memories. For example, one or more processors may be configured to perform one or more functions of one or more components of system 1700, such as by executing instructions stored in one or more memories, or without requiring instructions from memory. In certain aspects, the one or more processors may be part of a single apparatus, such as a vehicle, a computing device, a user equipment, etc. In certain aspects, an apparatus may include one or more of the components of system 1700, and/or may be coupled to one or more components of system 1700.

In certain aspects, the multi-viewpoint gating controller 1702 can receive one or more inputs that can be used to determine a set of 2D views to use for 3D object detection. As depicted in FIG. 17, example inputs to the multi-viewpoint gating controller 1702 can include, but are not limited to, a 2D image 1704, 2D view selection information 1708, geolocation information 1710, and information from a detection head 902. Though FIG. 17 illustrates certain example inputs, any suitable single input or combination of inputs may be used in certain aspects. Further, any of such inputs may come from a device including multi-viewpoint gating controller 1702 and/or one or more other devices. As an example, the multi-viewpoint gating controller 1702 may be used with any of the multi-2D-viewpoint 3D object detection discussed herein, such as with respect to FIGS. 3A-13.

In certain aspects, the 2D image 1704 may be captured by a camera sensor (or another sensor) and provided to the multi-viewpoint gating controller 1702. For example, the 2D image 1704 may represent an image captured of the surrounding environment by an image sensor, such as a camera. In certain aspects, the image sensor may be the image sensor 326 and can be mounted on a vehicle as previously described with respect to the image sensor 326. As the vehicle moves, the image sensor captures 2D image frames depicting a perspective view of the external scene from the viewpoint of the image sensor. The 2D image 1704 may depict an example image frame acquired by the sensor.

In certain aspects, the multi-viewpoint gating controller 1702 may perform 2D object detection on the 2D image 1704. Alternatively, or in addition, a 2D object detection processor 1706 can perform 2D object detection prior to providing the 2D image 1704 and/or indication of detected object(s) to the multi-viewpoint gating controller 1702. In certain aspects, the 2D image 1704 and/or indication of detected object(s) may be received from another device, such as another vehicle, via wireless communications. 2D object detection, such as 2D object detection 1706, can analyze the 2D image 1704 to detect objects present within an image frame. In certain aspects, 2D object detection may implement standard 2D object detection techniques such as faster region-based convolutional neural networks (R-CNNs), You Only Look Once X (YOLOX), Single Shot Detectors (SSDs), etc. In some cases, these techniques can apply trained machine learning models to classify objects and/or determine respective 2D bounding boxes in the image view. Example detected objects can include vehicles, pedestrians, traffic signs, lane markings, barriers, buildings, and other vehicles. In certain aspects, the 2D detections provided to the multi-viewpoint gating controller 1702 can guide selection of 2D views. For instance, detecting a traffic sign in the image could cue inclusion of a front-facing projected view targeting that region of space. In another example, if the 2D image is from a particular viewpoint and an object (e.g., of an object class of relevance, such as bike, sign, etc., such as of a list of relevant object classes) is detected in the 2D image, one or more 2D views from the same and/or overlapping viewpoint may be enabled to perform 3D object detection. Such 2D object detection 1706 may be less processing intensive than using additional views for multi-2D-viewpoint object detection, and therefore may reduce computation complexity and/or latency for performing 3D object detection.

In certain aspects, the 2D view selection 1708 may specify certain preferred or recommended 2D views to use, such as based on the driving scenario, environment, required coverage, and/or other factors. For example, a front view and side view combination may provide optimal coverage for urban driving. In certain aspects, a selected 2D view may be chosen manually by a user. For example, in an autonomous driving system, the user could be a passenger in the vehicle. Through a user interface, the passenger could specify a preferred 2D view to focus on, such as a front view, side view, rear view, etc. This 2D view selection 1708 acts as a cue for the multi-viewpoint gating controller 1702 to utilize that user-specified 2D view during 3D object detection. In certain aspects, the user could select the 2D view in real-time while the autonomous vehicle is operating. For instance, if the user notices a particular region of interest, they can designate the appropriate 2D view targeting that region to improve perception. In certain aspects, the multi-viewpoint gating controller 1702 can dynamically adapt the view transformation stage based on this 2D view selection 1708. In certain aspects, the 2D view selection 1708 may be received from another device, such as another vehicle, via wireless communications.

In certain aspects, geolocation information 1710 provides location context that can indicate presence of known structures like bridges, tunnels, or traffic signs that may favor certain 2D views. In certain aspects, the geolocation information 1710 may be provided by a GPS unit integrated with the autonomous vehicle platform. The GPS coordinates and supplemental GPS metadata can indicate the vehicle's physical location within the surrounding environment. As another example, the geolocation information 1710 may be received from another apparatus, such as a remote server or another vehicle, via wireless transmission. For instance, the geolocation details for an upcoming complex intersection could be sent to the vehicle by networked infrastructure or a proximate mapping car. In certain aspects, the geolocation information 1710 from either the onboard GPS or external apparatus can convey the spatial context including known structures and semantic details about the current physical scene. This may allow the multi-viewpoint gating controller 1702 to anticipate the presence of known objects ahead of time based on the indicated location. For example, GPS coordinates matching a pre-mapped intersection would cue inclusion of multiple 2D views to fully perceive the complex region.

In certain aspects, the geolocation input 1710 from local and remote sources can allow the multi-viewpoint gating controller 1702 to select 2D views tailored to the current driving location to improve perception of the surrounding 3D environment. The geographic context guides view gating to focus on spatial areas requiring more comprehensive multi-perspective sensing.

In certain aspects, the detection head 902 can provide an output that may be used by the multi-viewpoint gating controller 1702 to control 2D view selection. For instance, the detection head 902 may correspond to an auxiliary view-specific detection module as described earlier with respect to FIG. 9. The detection head 902 can analyze features from a particular 2D view to perform preliminary object detection for that view. The resulting detections, which may include per-view bounding boxes, object scores, and/or class predictions, may indicate the information gained from that specific viewpoint. In certain aspects, if the detection head 902 produces detections for certain objects in the 2D view having higher confidence scores or otherwise more likely to be an actual detection, the detection head 902 can provide the suggested view to the multi-viewpoint gating controller 1702. In certain aspects, limited or missing detections from the detection head 902 can indicate that the corresponding 2D view may not be adding value. Such object detection using a single view may be less processing intensive than using additional views for multi-2D-viewpoint object detection, and therefore may reduce computation complexity and/or latency for performing 3D object detection.

In certain aspects, based on the one or more inputs provided to the multi-viewpoint gating controller 1702, the multi-viewpoint gating controller 1702 can gate, or filter out, one or more 2D views such that it is not used by the main detection head 322 or used by a cross-attention module 316. For example, if front view detections from detection head 902 are weak, the multi-viewpoint gating controller 1702 can disable the front view projection via view transformer 312, or otherwise not provide such front view to main detection head 322 or cross-attention module 316.

In certain aspects, the multi-viewpoint gating controller 1702 may use the one or more inputs to gate specific cross-attentions inside the main detection head 322 itself. For instance, if side view detections are strong while front view detections are weak, cross-attention between centerness heatmaps for these front views in the detection head 322 may be omitted to reduce computations.

Example data 1712 depicts different types of information that may be output from the multi-viewpoint gating controller 1702 in certain aspects. Example data 1712 includes one or more of the following: a recommended 2D view 1714, a zone 1716, other information 1718, and 2D view data/attended features 1720. In certain aspects, the recommended 2D view 1714 indicates a 2D viewpoint that could be enabled, or disabled, for subsequent processing by the detection head 322, the view transformer 312, or otherwise not used for 3D object detection. For example, the recommended 2D view 1714 may specify use of a front view.

The zone 1716 may correspond to a spatial zone or region that should be covered by a set of 2D views, such that the set of views are enabled or disabled. In certain aspects, other information 1718 can include, but is not limited to 2D views projected by the transformer 312 and then encoded by encoder 314 to extract view specific features. Thus, the other information 1718 can represent an example encoded view provided as input to the cross-attention modules 316. In certain aspects, the attended features 1720 correspond to the cross-attended features 508 generated by application of cross-attention to consolidate information between the multiple encoded 2D views. The attended features 1720 may be the outputs from the cross-attention modules 316 or another cross-attention module.

Based on the one or more inputs, the multi-viewpoint gating controller 1702 can determine a set of 2D views to use for multi-2D-viewpoint 3D object detection. Though certain aspects of multi-viewpoint gating are described with respect to specific multi-2D-viewpoint 3D object detection, such as those discussed herein, multi-viewpoint gatin may similarly be used with any suitable multi-2D-viewpoint 3D object detection. For example, certain aspects are discussed with using multi-viewpoint gating to determine whether certain 2D views are generated using transformer 312, and/or are used for cross-attention of 2D views and/or centerness heatmaps. However, it should be understood that such multi-viewpoint gating may control other multi-2D-viewpoint 3D object detection in a different manner to cause certain 2D views to be enabled and/or disabled, such as by enabling/disabling connections and/or inputs of such 2D views to a system.

Figure 18:
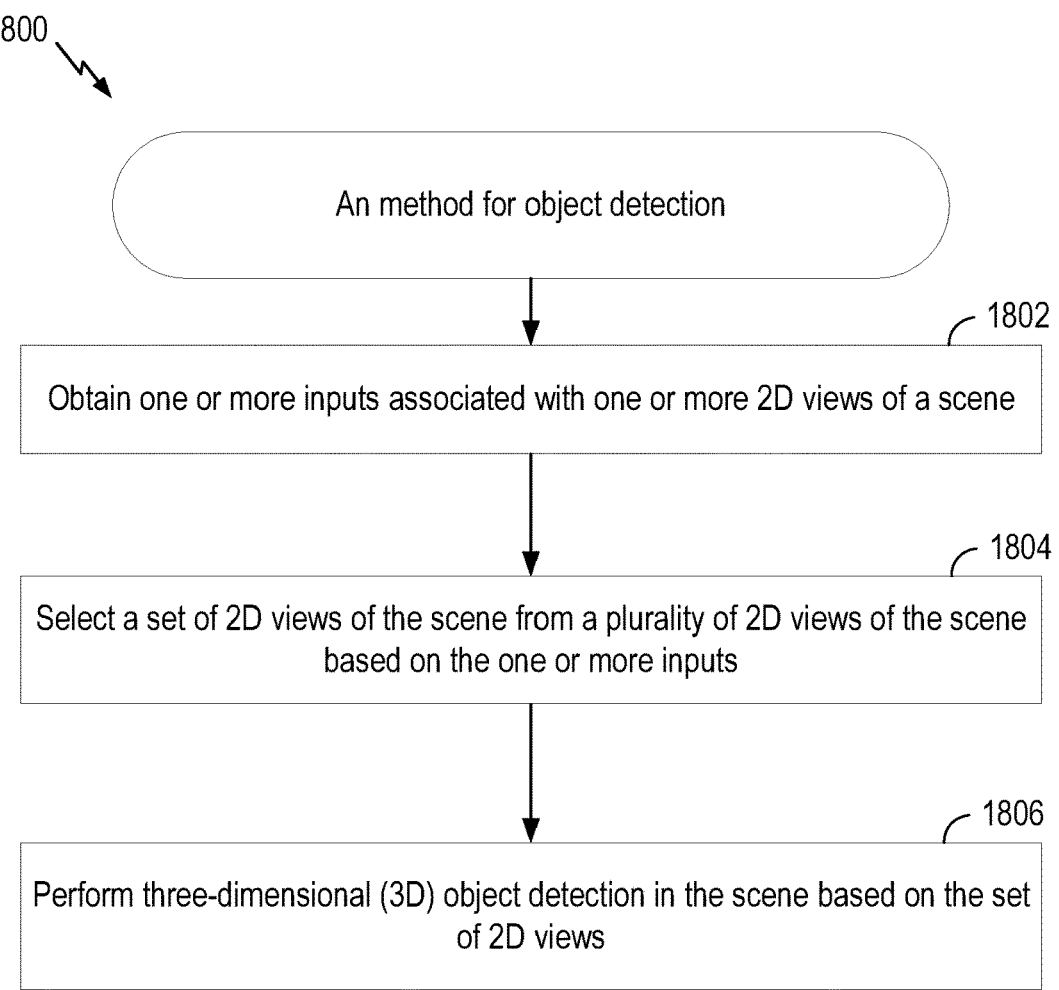
FIG. 18 depicts an example method for performing 3D object detection using selected sets of 2D views.

FIG. 18 depicts an example method 1800 of performing multi-2D-viewpoint 3D object detection using selected 2D views in accordance with aspects of the present disclosure. In certain aspects, method 1800 can be implemented by any of the multi-2D-viewpoint 3D object detection systems described herein, such as with respect to FIGS. 3A-11 or FIG. 17.

Method 1800 starts at block 1802 with obtaining one or more inputs associated with one or more two-dimensional (2D) views of a scene.

The method 1800 continues to block 1804 with selecting a set of 2D views of the scene from a plurality of 2D views of the scene based on the one or more inputs, the set of 2D views comprising a first 2D view of the scene and a second 2D view of the scene.

Method 1800 continues to block 1806 with performing 3D object detection in the scene based on the set of 2D views.

In certain aspects, the one or more inputs comprise a user input indicating at least one 2D view of the scene to include in the set of 2D views, the at least one 2D view of the scene comprising the first 2D view.

In certain aspects, the one or more inputs comprise a user input indicating at least one 2D view of the scene to not include in the set of 2D views.

In certain aspects, the one or more inputs include geolocation information associated with the scene. In certain aspects, the geolocation information includes at least one of a traffic light location, a road sign location, or a road feature location.

In certain aspects, the one or more inputs are obtained from one or more other apparatuses. In certain aspects, the at least one of the one or more inputs comprises a first input indicating at least one 2D view of the plurality of 2D perspective views not to include in the set of 2D perspective views. In certain aspects, the at least one of the one or more inputs comprises a first input indicating at least one 2D perspective view of the plurality of 2D perspective views to include in the set of 2D perspective views, the at least one 2D perspective view of the scene comprising the first 2D perspective view.

In certain aspects, the one or more inputs comprise a 2D image of the scene corresponding to at least one 2D view of the scene of the plurality of 2D views, and wherein selecting the set of 2D views comprises performing 2D object detection on the 2D image; and including the at least one 2D view of the scene in the set of 2D views based on the 2D object detection indicating a detected object, the at least one 2D view of the scene comprising the first 2D view. In certain aspects, the 2D image is obtained from an image sensor.

In certain aspects, the one or more inputs comprise a 2D image of the scene corresponding to at least one 2D view of the scene of the plurality of 2D views, and selecting the set of 2D views comprises performing 2D object detection on the 2D image and refraining from including the at least one 2D view of the scene in the set of 2D views based on the 2D object detection not indicating a detected object.

In certain aspects, the one or more inputs comprise a first set of features based on the first 2D perspective view, and selecting the set of 2D views comprises including the first 2D view of the scene in the set of 2D views based on the first set of features indicating a likelihood of an object detected in the first 2D view that satisfies a threshold.

In certain aspects, the one or more inputs comprise a set of features based on a third 2D view of the plurality of 2D views, and selecting the set of 2D perspective views comprises refraining from including the third 2D view in the set of 2D views based on the set of features indicating a likelihood of an object detected in the third 2D view does not satisfy a threshold.

In certain aspects, method 1800 further includes generating the set of 2D views from a 3D representation of the scene. In certain aspects, the 3D representation of the scene comprises a point cloud. In certain aspects, method 1800 further includes obtaining the 3D representation of the scene from a sensor. In certain aspects, the sensor comprises a light detection and ranging (LiDAR) sensor. In certain aspects, the LiDAR sensor is integrated into one of a vehicle, an extra-reality device, or a mobile device. In certain aspects, method 1800 further includes generating the 3D representation from one or more 2D images of the scene.

In certain aspects, performing the 3D object detection comprises obtaining a respective set of features for each of the set of 2D perspective views; performing cross-attention between the respective sets of features to obtain sets of cross-attended features; and performing 3D object detection in the scene based on the sets of cross-attended features.

In certain aspects, the first 2D perspective view is a bird's eye view perspective and the second 2D perspective view is a front view perspective.

In certain aspects, method 1800 further includes displaying bounding boxes around detected 3D objects in the scene.

In certain aspects, method 1800 further includes sending one or more indications of one or more 3D objects detected in the scene to one or more devices.

In certain aspects, method 1800 further includes receiving at least one of one or more 2D representations of the scene or one or more indications of one or more 3D objects detected in the scene. In certain aspects, the first 2D perspective view of the scene comprises at least one of the received one or more 2D representations of the scene.

Note that FIG. 18 is just one example of a method, and other methods including fewer, additional, or alternative steps are possible consistent with this disclosure.

Example Processing System for Performing Multi-2D-Viewpoint 3D Object Detection Using Selected 2D Views FIG. 19 depicts aspects of an example processing system 1900.

The processing system 1900 includes a processing system 1902 including one or more processors 1920. The one or more processors 1920 are coupled to a computer-readable medium/memory 1930 via a bus 1906. In certain aspects, the computer-readable medium/memory 1930 is configured to store instructions (e.g., computer-executable code) that when executed by the one or more processors 1920, cause the one or more processors 1920 to perform the method 1800 described with respect to FIG. 18, or any aspect related to it, including any additional steps or sub-steps described in relation to FIG. 18.

In the depicted example, computer-readable medium/memory 1930 stores code (e.g., executable instructions) for obtaining one or more inputs 1931, code for selecting a set of 2D views 1932, and code for performing 3D object detection 1933. Processing of the code 1931-1933 may enable and cause the processing system 1900 to perform the method 1800 described with respect to FIG. 18, or any aspect related to it.

The one or more processors 1920 include circuitry configured to implement (e.g., execute) the code stored in the computer-readable medium/memory 1930, including circuitry for obtaining inputs 1921, circuitry for selecting a set of 2D views 1922, and circuitry for performing 3D object detection 1923. Processing with circuitry 1921-1923 may enable and cause the processing system 1900 to perform the method 1800 described with respect to FIG. 18, or any aspect related to it.

EXAMPLE CLAUSES

Implementation examples are described in the following numbered clauses:

Clause 1: A method comprising: obtaining a first set of features based on a first two-dimensional (2D) view of a scene corresponding to a first viewpoint; obtaining a second set of features based on a second 2D view of the scene corresponding to a second viewpoint, wherein the first 2D view and the second 2D view are based on input from a first input sensor; obtaining a third set of features based on a third 2D view of the scene corresponding to a third viewpoint; obtaining a fourth set of features based on a fourth 2D view of the scene corresponding to a fourth viewpoint, wherein the third 2D view and the fourth 2D view are based on input from a second input sensor; performing cross-attention between the first set of features and the second set of features to obtain a first set of cross-attended features; performing cross-attention between the third set of features and the fourth set of features to obtain a second set of cross-attended features; and performing 3D object detection in the scene based on at least the first set of cross-attended features and the second set of cross-attended features.

Clause 2: A method in accordance with Clause 1, wherein obtaining the first set of features comprises processing the first 2D view through a first encoder to obtain the first set of features; and obtaining the second set of features comprises processing the second 2D view through a second encoder to obtain the second set of features.

Clause 3: A method in accordance with any one of clauses 1-2, wherein the first input sensor is a light detection and ranging (LiDAR) sensor and the second input sensor is an image sensor.

Clause 4: A method in accordance with any one of clauses 1-3, further comprising: fusing the first set of cross-attended features with the second set of cross-attended features to obtain a set of fused features, wherein the 3D object detection in the scene based on at least the first set of cross-attended features and the second set of cross-attended features comprises the 3D object detection in the scene based on at least the set of fused features.

Clause 5: A method in accordance with any one of clauses 1-4, further comprising: transforming a three-dimensional (3D) representation of the scene based on the input from the first input sensor to the first 2D view; and transforming the 3D representation of the scene based on the input from the first input sensor to the second 2D view.

Clause 6: A method in accordance with clauses 5, further comprising: receiving a 3D point cloud representation of the scene as the input from the first input sensor; and generating a 3D voxel representation of the 3D point cloud, wherein the 3D representation of the scene comprises the 3D voxel representation of the 3D point cloud.

Clause 7: A method in accordance with clauses 6, wherein transforming the 3D representation of the scene to the first 2D view comprises geometrically projecting the 3D voxel representation of the 3D point cloud to the first 2D view; and wherein transforming the 3D representation of the scene to the second 2D view comprises geometrically projecting the 3D voxel representation of the 3D point cloud to the second 2D view.

Clause 8: A method in accordance with any one of clauses 1-7, wherein the first 2D view is a bird's eye view and the second 2D view is a front view.

Clause 9: A method in accordance with any one of clauses 1-8, wherein performing cross-attention between the first set of features and the second set of features to obtain the first set of cross-attended features comprises performing cross-attention between the first set of features as a first query and the second set of features as a first key and value to obtain the first set of cross-attended features; performing cross-attention between the second set of features as a second query and at least the first set of features as a second key and value to obtain a third set of cross-attended features; and fusing the first set of cross-attended features and the second set of cross-attended features with the third set of cross-attended features to obtain a set of fused features, wherein the 3D object detection in the scene based on at least the first set of cross-attended features and the second set of cross-attended features comprises the 3D object detection in the scene based on at least the set of fused features.

Clause 10: A method in accordance with clauses 9, wherein the at least the first set of features as the second key and value comprises the first set of cross-attended features as the second key and value.

Clause 11: A method in accordance with clause 9, wherein fusing the first set of cross-attended features and the second set of cross-attended features with the third set of cross-attended features comprises concatenating the first set of cross-attended features, the second set of cross-attended features, and the third set of cross-attended features.

Clause 12: A method in accordance with any one of clauses 1-11, further comprising: obtaining one or more additional sets of features based on one or more additional 2D views of the scene corresponding to additional viewpoints; performing cross-attention between the first set of features and each of the one or more additional sets of features to obtain one or more additional sets of cross-attended features; and fusing the one or more additional sets of cross-attended features with the first set of cross-attended features and the second set of cross-attended features to obtain a set of fused features, wherein the 3D object detection in the scene based on at least the first set of cross-attended features and the second set of cross-attended features comprises the 3D object detection in the scene based on at least the set of fused features.

Clause 13: A method in accordance with any one of clauses 1-12, wherein performing 3D object detection in the scene comprises generating a first centerness heatmap for an object class based on at least the first set of cross-attended features; generating a second centerness heatmap for the object class based on at least the second set of features; and performing cross-attention between the first centerness heatmap and the second centerness heatmap to obtain a third set of cross-attended features, wherein the 3D object detection in the scene based on at least the first set of cross-attended features and the second set of cross-attended features comprises the 3D object detection in the scene based on at least the third set of cross-attended features.

Clause 14: A method in accordance with clauses 13, further comprising: causing the apparatus to perform 3D object detection in the scene based on the second centerness heatmap.

Clause 15: A method in accordance with any one of clauses 1-14, further comprising: generating a three-dimensional (3D) representation of the scene from one or more 2D images of the scene, the input from the second input sensor comprising the one or more 2D images of the scene; transforming the 3D representation of the scene to the third 2D view; and transforming the 3D representation of the scene to the fourth 2D view.

Clause 16: A method in accordance with clause 15, wherein generating the 3D representation of the scene from the one or more 2D images of the scene comprises generating a 3D point cloud representation of the scene based on the one or more 2D images of the scene.

Clause 17: A method in accordance with any one of clauses 1-16, wherein the third 2D view and the first 2D view are from a same viewpoint.

Clause 18: A method in accordance with any one of clauses 1-17, wherein the input from the first input sensor comprises a LiDAR based point cloud of the scene, and wherein the input from the second input sensor comprises one or more images of the scene.

Clause 19: A method in accordance with any one of clauses 1-18, further comprising: pillarizing a three-dimensional (3D) representation of the scene to obtain the first 2D view; and pillarizing the 3D representation of the scene to obtain the second 2D view.

Clause 20: A method in accordance with any one of clauses 1-19, further comprising the second input sensor comprising a camera obtaining at least one image of the scene, the input from the second input sensor comprising the at least one image of the scene.

Clause 21: A method in accordance with any one of clauses 1-20, further comprising a display displaying bounding boxes around detected 3D objects in the scene.

Clause 22: A method in accordance with any one of clauses 1-21, further comprising the first input sensor comprising a LiDAR sensor generating a 3D point cloud representation of the scene, wherein the input of the first input sensor comprises the 3D point cloud representation of the scene.

Clause 23: A method in accordance with clause 22, wherein the LiDAR sensor is integrated into one of a vehicle, an extra-reality device, or a mobile device.

Clause 24: A method in accordance with any one of clauses 1-23, further comprising a modem coupled to one or more antennas, sending one or more indications of one or more 3D objects detected in the scene to one or more devices.

Clause 25: A method in accordance with any one of clauses 1-24, further comprising a modem coupled to one or more antennas, receiving at least one of one or more 2D representations of the scene or one or more indications of one or more 3D objects detected in the scene.

Clause 26: A method in accordance with clause 25, wherein the first 2D view of the scene comprises at least one of the received one or more 2D representations of the scene.

Clause 27: A method comprising: obtaining a first set of features based on a first 2D view of a scene corresponding to a first viewpoint; obtaining a second set of features based on a second 2D view of the scene corresponding to a second viewpoint; generating a first centerness heatmap for an object class based on at least the first set of features; generating a second centerness heatmap for the object class based on the second set of features; performing cross-attention between the first centerness heatmap and the second centerness heatmap to obtain a first set of cross-attended features; and performing 3D object detection in the scene based on the first set of cross-attended features.

Clause 28: A method in accordance with clause 27, further comprising a camera obtaining at least one image of the scene, and processing the at least one image to generate the first 2D view.

Clause 29: A method comprising: obtaining one or more inputs associated with one or more two-dimensional (2D) views of a scene; selecting a set of 2D views of the scene from a plurality of 2D views of the scene based on the one or more inputs, the set of 2D views comprising a first 2D view of the scene and a second 2D view of the scene; and performing three-dimensional (3D) object detection in the scene based on the set of 2D views.

Clause 30: A method in accordance with clause 29, wherein the one or more inputs comprise a user input indicating at least one 2D view of the scene to include in the set of 2D views, the at least one 2D view of the scene comprising the first 2D view.

Clause 31: A method in accordance with any one of clauses 29-30, wherein the one or more inputs comprise a user input indicating at least one 2D view of the scene to not include in the set of 2D views.

Clause 32: A method in accordance with any one of clauses 29-31, further comprising obtaining at least one of the one or more inputs from one or more other apparatuses.

Clause 33: A method in accordance with clause 32, wherein the at least one of the one or more inputs comprises a first input indicating at least one 2D view of the plurality of 2D views not to include in the set of 2D views.

Clause 34: A method in accordance with clause 32, wherein the at least one of the one or more inputs comprises a first input indicating at least one 2D view of the plurality of 2D views to include in the set of 2D views, the at least one 2D view of the scene comprising the first 2D view.

Clause 35: A method in accordance with clause 32, further communicating with the one or more other apparatuses, such as using a modem.

Clause 36: A method in accordance with clause 35, wherein the communicating is further performed using one or more antennas.

Clause 37: A method in accordance with any one of clauses 29-36, wherein the one or more inputs comprise a 2D image of the scene corresponding to at least one 2D view of the scene of the plurality of 2D views, and wherein selecting the set of 2D views, comprises: performing 2D object detection on the 2D image; and including the at least one 2D view of the scene in the set of 2D views based on the 2D object detection indicating a detected object, the at least one 2D view of the scene comprising the first 2D view.

Clause 38: A method in accordance with clause 37, further comprising obtaining the 2D image from an image sensor.

Clause 39: A method in accordance with any one of clauses 29-38, wherein the one or more inputs comprise a 2D image of the scene corresponding to at least one 2D view of the scene of the plurality of 2D views, and wherein selecting the set of 2D views comprises performing 2D object detection on the 2D image; and refraining from including the at least one 2D view of the scene in the set of 2D views based on the 2D object detection not indicating a detected object.

Clause 40: A method in accordance with any one of clauses 29-39, wherein obtaining the one or more inputs comprises obtaining a first set of features based on the first 2D view, and wherein selecting the set of 2D views comprises including the first 2D view of the scene in the set of 2D views based on the first set of features indicating a likelihood of an object detected in the first 2D view that satisfies a threshold.

Clause 41: A method in accordance with any one of clauses 29-40, wherein obtaining the one or more inputs comprises obtaining a set of features based on a third 2D view of the plurality of 2D views, and wherein selecting the set of 2D views comprises refraining from including the third 2D view in the set of 2D views based on the set of features indicating a likelihood of an object detected in the third 2D view does not satisfy a threshold.

Clause 42: A method in accordance with any one of clauses 29-41, comprising generating the set of 2D views from a 3D representation of the scene.

Clause 43: A method in accordance with clause 42, wherein the 3D representation of the scene comprises a point cloud.

Clause 44: A method in accordance with clause 42, further comprising obtaining the 3D representation of the scene from a sensor.

Clause 45: A method in accordance with clause 44, wherein the sensor comprises a light detection and ranging (LiDAR) sensor.

Clause 46: A method in accordance with clause 45, further comprising obtaining the 3D representation of the scene from the LiDAR sensor integrated into one of a vehicle, an extra-reality device, or a mobile device.

Clause 47: A method in accordance with clause 44, comprising generating the 3D representation from one or more 2D images of the scene.

Clause 48: A method in accordance with any one of clauses 29-47, wherein performing the 3D object detection comprises obtaining a respective set of features for each of the set of 2D views; performing cross-attention between the respective sets of features to obtain sets of cross-attended features; and performing 3D object detection in the scene based on the sets of cross-attended features.

Clause 49: A method in accordance with any one of clauses 29-48, wherein the first 2D view is a bird's eye view perspective and the second 2D view is a front view perspective.

Clause 50: A method in accordance with any one of clauses 29-49, comprising displaying bounding boxes around detected 3D objects in the scene.

Clause 51: A method in accordance with any one of clauses 29-50, comprising sending, by a modem coupled to one or more antennas, one or more indications of one or more 3D objects detected in the scene to one or more devices.

Clause 52: A method in accordance with any one of clauses 29-51, comprising receiving, by a modem coupled to one or more antennas, at least one of one or more 2D representations of the scene or one or more indications of one or more 3D objects detected in the scene.

Clause 53: A method in accordance with clause 52, wherein the first 2D view of the scene comprises at least one of the received one or more 2D representations of the scene.

Clause 54: A method in accordance with any one of clauses 29-53, wherein the first 2D view corresponds to a first viewpoint and the second 2D view corresponds to a second viewpoint different than the first viewpoint.

Clause 55: An apparatus, comprising: one or more memories (e.g., comprising executable instructions); and one or more processors, coupled to the one or more memories, configured to (e.g., execute the executable instructions and) (e.g., cause the apparatus to) perform a method in accordance with any one of clauses 1-54.

Clause 56: An apparatus, comprising means for performing a method in accordance with any one of clauses 1-54.

Clause 57: A non-transitory computer-readable medium storing program code for causing a processing system to perform the steps of any one of clauses 1-54.

Clause 58: A computer program product embodied on a computer-readable storage medium comprising code for performing a method in accordance with any one of clauses 1-54.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, a phrase referring to "a set of" items, refers to one or more of such item.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In a particular embodiment, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus configured for object detection, comprising:
   one or more memories configured to store a first two-dimensional (2D) view of a scene and a second 2D view of the scene; and
   one or more processors, coupled to the one or more memories, configured to:
      obtain one or more inputs associated with one or more 2D views of the scene, wherein the one or more inputs comprise a 2D image of the scene corresponding to at least one 2D view of the scene of a plurality of 2D views of the scene;

select a set of 2D views of the scene from the plurality of 2D views of the scene based on the one or more inputs, the set of 2D views comprising the first 2D view and the second 2D view, wherein the selection of the set of 2D views includes to:

perform 2D object detection on the 2D image, and refrain from including the at least one 2D view of the scene in the set of 2D views based on the 2D object detection not indicating a detected object; and perform three-dimensional (3D) object detection in the scene based on the set of 2D views.

2. The apparatus of claim 1, wherein the one or more inputs comprise a user input indicating at least one additional 2D view of the scene to include in the set of 2D views, the at least one additional 2D view of the scene comprising the first 2D view.

3. The apparatus of claim 1, wherein the one or more inputs comprise a user input indicating at least one additional 2D view of the scene to not include in the set of 2D views.

4. The apparatus of claim 1, wherein to obtain the one or more inputs, the one or more processors are configured to obtain at least one of the one or more inputs from one or more other apparatuses.

5. The apparatus of claim 4, wherein the at least one of the one or more inputs comprises a first input indicating at least one additional 2D view of the plurality of 2D views not to include in the set of 2D views.

6. The apparatus of claim 4, wherein the at least one of the one or more inputs comprises a first input indicating at least one additional 2D view of the plurality of 2D views to include in the set of 2D views, the at least one additional 2D view of the scene comprising the first 2D view.

7. The apparatus of claim 4, further comprising a modem, coupled to one or more antennas, wherein the modem and the one or more antennas are configured to communicate with the one or more other apparatuses.

8. The apparatus of claim 1, wherein the one or more inputs comprise an additional 2D image of the scene corresponding to at least one additional 2D view of the scene of the plurality of 2D views, and wherein to select the set of 2D views, the one or more processors are configured to:

perform additional 2D object detection on the additional 2D image; and include the at least one additional 2D view of the scene in the set of 2D views based on the additional 2D object detection indicating a detected object, the at least one additional 2D view of the scene comprising the first 2D view.

9. The apparatus of claim 1, further comprising an image sensor, wherein to obtain the one or more inputs, the one or more processors are configured to obtain the 2D image from the image sensor.

10. The apparatus of claim 1, wherein to obtain the one or more inputs, the one or more processors are configured to obtain a first set of features based on the first 2D view, and wherein to select the set of 2D views, the one or more processors are configured to:

include the first 2D view of the scene in the set of 2D views based on the first set of features indicating a likelihood of an object detected in the first 2D view that satisfies a threshold.

11. The apparatus of claim 1, wherein to refrain from including the at least one 2D view of the scene in the set of 2D views based on the 2D object detection not indicating a detected object, the one or more processors are configured to:

refrain from including the at least one 2D view of the scene in the set of 2D views based on a set of features corresponding to the 2D image indicating a likelihood of an object detected in the third at least one 2D view does not satisfy a threshold.

12. The apparatus of claim 1, further comprising a sensor, wherein:

the one or more processors are configured to at least one of:

obtain a 3D representation of the scene from the sensor, the 3D representation of the scene comprising a point cloud; or generate the 3D representation from one or more 2D images of the scene; and the one or more processors are configured to generate the set of 2D views from the 3D representation of the scene.

13. The apparatus of claim 12, wherein the sensor comprises a comprising a light detection and ranging (LiDAR) sensor integrated into one of a vehicle, an extra-reality device, or a mobile device.

14. The apparatus of claim 1, wherein to perform the 3D object detection, the one or more processors are configured to:

obtain a respective set of features for each of the set of 2D views;

perform cross-attention between the respective sets of features to obtain sets of cross-attended features; and perform 3D object detection in the scene based on the sets of cross-attended features.

15. The apparatus of claim 1, wherein the first 2D view is a bird's eye view perspective and the second 2D view is a front view perspective.

16. The apparatus of claim 1, further comprising a display, coupled to the one or more processors, configured to display bounding boxes around detected 3D objects in the scene.

17. The apparatus of claim 1, further comprising a modem, coupled to one or more antennas, and coupled to the one or more processors, wherein the modem and one or more antennas are configured to send one or more indications of one or more 3D objects detected in the scene to one or more devices.

18. The apparatus of claim 1, further comprising a modem, coupled to one or more antennas, and coupled to the one or more processors, wherein the modem and one or more antennas are configured to receive at least one of one or more 2D representations of the scene or one or more indications of one or more 3D objects detected in the scene, wherein the first 2D view of the scene comprises at least one of the received one or more 2D representations of the scene.

19. The apparatus of claim 1, wherein the first 2D view corresponds to a first viewpoint and the second 2D view corresponds to a second viewpoint different than the first viewpoint.

20. A method comprising:

obtaining one or more inputs associated with one or more two-dimensional (2D) views of a scene, wherein the one or more inputs comprise a 2D image of the scene corresponding to at least one 2D view of the scene of a plurality of 2D views of the scene;

selecting a set of 2D views of the scene from the plurality of 2D views of the scene based on the one or more inputs, the set of 2D views comprising a first 2D view of the scene and a second 2D view of the scene, wherein selecting the set of 2D views comprises:

performing 2D object detection on the 2D image; and refraining from including the at least one 2D view of the scene in the set of 2D views based on the 2D object detection not indicating a detected object; and performing three-dimensional (3D) object detection in the scene based on the set of 2D views.

* * * * *